US007983883B2

(12) United States Patent
Chen et al.

(10) Patent No.: US 7,983,883 B2
(45) Date of Patent: Jul. 19, 2011

(54) ENRICHED MULTI-POINT FLUX APPROXIMATION

(75) Inventors: Qian-Yong Chen, Amherst, MA (US); Richard T. Mifflin, Houston, TX (US); Jing Wan, Houston, TX (US); Yahan Yang, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 398 days.

(21) Appl. No.: 12/373,475

(22) PCT Filed: May 18, 2007

(86) PCT No.: PCT/US2007/012223
§ 371 (c)(1),
(2), (4) Date: Jan. 12, 2009

(87) PCT Pub. No.: WO2008/020906
PCT Pub. Date: Feb. 21, 2008

(65) Prior Publication Data
US 2009/0281776 A1 Nov. 12, 2009

Related U.S. Application Data

(60) Provisional application No. 60/837,499, filed on Aug. 14, 2006.

(51) Int. Cl.
G06F 7/60 (2006.01)
G06G 7/48 (2006.01)
G06G 7/50 (2006.01)
(52) U.S. Cl. .................. 703/6; 703/2; 703/9; 703/10
(58) Field of Classification Search .............. 703/2, 6, 703/9, 10
See application file for complete search history.

(56) References Cited

U.S. PATENT DOCUMENTS

| 4,821,164 | A | * | 4/1989 | Swanson ........................... 702/5 |
| 6,018,497 | A | | 1/2000 | Gunasekera |
| 6,078,869 | A | | 6/2000 | Gunasekera |
| 6,106,561 | A | | 8/2000 | Farmer |
| 6,823,297 | B2 | | 11/2004 | Jenny et al. |
| 6,826,520 | B1 | | 11/2004 | Khan et al. |
| 6,928,399 | B1 | * | 8/2005 | Watts, III et al. ............... 703/2 |
| 7,031,841 | B2 | * | 4/2006 | Zazovsky et al. ............... 702/12 |
| 7,054,749 | B1 | * | 5/2006 | O'Meara, Jr. .................... 702/6 |
| 7,149,671 | B2 | | 12/2006 | Lim et al. |

(Continued)

FOREIGN PATENT DOCUMENTS
WO    WO 01/40911    6/2001
(Continued)

OTHER PUBLICATIONS

Aarnes et al. "Toward Reservoir Simulation on Geological Grid Models", 9th European Conference on the Mathematics of Oil Recovery—Cannes, France, Aug. 30-Sep. 2, 2004.*

(Continued)

Primary Examiner — Kamini S Shah
Assistant Examiner — Shambhavi Patel

(57) ABSTRACT

Methods and systems to reduce or eliminate numerical oscillations in solutions that occur when using conventional MPFA when modeling flow in a reservoir are provided. The technique may be referred to as enriched multi-point flux approximation (EMPFA) and may be used to improve the consistency and accuracy in constructing pressure interpolations in cells for the purpose of determining flux equations used in predicting flow in a reservoir.

14 Claims, 14 Drawing Sheets

200

┌─ 202
Divide Reservoir Into a Finite Number of Grid Cells

┌─ 204
Define Interaction Region Contained Within Adjacent Cells in the Grid

┌─ 206
Perform Enriched Multipoint Flux Approximation that Allows Continuous Pressure Interpolation Within an Interaction Region by Introducing a Pressure Unknown Within the Interaction Region

U.S. PATENT DOCUMENTS

| | | | |
|---|---|---|---|
| 7,310,579 B2 | 12/2007 | Richard et al. | |
| 7,496,488 B2* | 2/2009 | Jenny et al. | 703/10 |
| 7,542,890 B2* | 6/2009 | Yang et al. | 703/9 |
| 7,546,229 B2* | 6/2009 | Jenny et al. | 703/10 |
| 7,617,083 B2* | 11/2009 | Bennis et al. | 703/10 |
| 7,707,018 B2* | 4/2010 | Shaw | 703/10 |
| 2005/0171699 A1* | 8/2005 | Zazovsky et al. | 702/11 |
| 2005/0203725 A1 | 9/2005 | Jenny et al. | |
| 2006/0056272 A1* | 3/2006 | Hill | 367/73 |
| 2006/0129366 A1 | 6/2006 | Shaw | |
| 2007/0150245 A1* | 6/2007 | Pomraning et al. | 703/9 |
| 2008/0167849 A1* | 7/2008 | Hales et al. | 703/10 |
| 2009/0265152 A1* | 10/2009 | Cacas et al. | 703/6 |
| 2009/0306945 A1* | 12/2009 | Wu et al. | 703/2 |

FOREIGN PATENT DOCUMENTS

| | | |
|---|---|---|
| WO | WO 2004/081845 | 9/2004 |

OTHER PUBLICATIONS

Edwards et al. "Finite volume discretization with imposed flux continuity for the general tensor pressure equation", Computational Geosciences 2 (1998) 259-290.*

Eigestad, Geir. "Reservoir simulation with imposed flux continuity conditions on heterogeneous and anisotropic media for general geometries, and the inclusion of hysteresis in forward modeling", Apr. 2003.*

Farmer, Chris. "Geological Modelling and Reservoir Simulation", 2005.*

Klausen et al. "Convergence of Multi Point Flux Approximations on Quadrilateral Grids", Numerical Methods for Partial Di_erential Equations 2005.*

Lee et al. "A finite-volume method with hexahedral multiblock grids for modeling flow in porous media", Computational Geosciences 6: 353-379, 2002.*

Nordbotten et al. "Discretization on Quadrilateral Grids with Improved Monotocity Properties", Journal of Computational Physics, 2005.*

Eigestad, G. T. and Klausen, R. A., *A Note on the Convergence of the Multi-Point Flux Approximation O-method; Numerical Experiments*, Preprint, Centre of Mathematica for Applications, University of Oslo, Nov. 2003, all.

Khattri, S. K., *A New Smoothing Algorithm of Quadrilateral and Hexahedral Meshes*, Computational Science—ICCS 2006, Volumbe 3992/2006, pp. 239-246, Springer Link Dater: May 12, 2006, all.

Klausen, R.A. and Eigestad, G. T., *Multi Point Flux Approximations and Finite Element Methods; Practical Aspects of Discountinuous Media*, 9th European conference on the Mathematics of Oil Recovery—Cannes, France, Aug. 30-Sep. 2, 2004.

Klausen, R. A. and Winther, R. *Convergence of Multi Point Flux Approximations on Quadrilateral Grids*, Pure Mathematics No. 3, Department of Math, University of Oslo, ISSN 0806-2439, Feb. 2005.

Klausen, R. A. and Winther, R., *Robust Convergence of Multi Point Flux Approximation on Rough Grids*, Pure Mathematics No. 36, Department of Math, University of Oslo, ISSN 0806-2439, Nov. 2005.

Klausen, R. A. and Russell, T. F., *Relationships Among Some Locally Conservative Discretization Methods Which Handle Discontinuous Coefficients*, Computational Geosciences, vol. 8, No. 4, pp. 341-377, Dec. 2004, all.

Klausen, R.A., *Convergence of Multi Point Flux Approximations on Quadrilateral Grid*, Numerical Methods for Partial Differential Equations, vol. 22, Issue 6, pp. 1438-1434. Published Online 11 MY 2006, all.

Nordbotten, J. M. and Eigestad, G. T., *Discretization on Quadrilateral Grids with Improved Monotonicity Properties*, Journal of Computational Physics 203 (2005) 744-760.

* cited by examiner

ENRICHED MULTI-POINT FLUX APPROXIMATION

This application is the National Stage of International Application No. PCT/US2007/012223, filed 18 May 2007, which claims the benefit of U.S. Provisional Application No. 60/837,499, filed 14 Aug. 2006.

BACKGROUND OF THE INVENTION

1. Field of the Invention

The present invention generally relates to the modeling of hydrocarbon reservoirs and particularly to providing a more consistent and accurate representation of fluid flows and pressure gradients.

2. Description of the Related Art

Locating petroleum deposits, drilling wells and managing the extraction of petroleum from a deposit is done at great expense. Due to the complicated and critical nature of locating and managing hydrocarbon deposits, new professions have evolved and special technologies have been developed in order to reduce uncertainty, lower costs, and optimize production. Petroleum engineers, production engineers, geophysicists and geologists now use computerized models of the earth's crust to plan exploration and manage production of petroleum reservoirs.

Reservoir conditions are not static and gas and liquids in a reservoir can move rapidly. Engineers use numerical simulations in modeling the movements of gas and liquid in hydrocarbon reservoirs. These simulations aid engineers in gaining a better understanding of a reservoir's structure and flow properties, as well as aiding in developing an optimal production strategy which maximizes recovery and achieves the best economic result. Modern reservoir modeling has rapidly grown in complexity and can involve the integration of numerous software packages and computational engines. However, a modeling task can generally be broken down into five major steps: geological modeling, gridding and property generation, initialization, history matching and prediction.

Geological modeling concerns establishing reservoir geometry, reservoir boundaries and faults, as well as establishing basic rock properties such as porosity and permeability distributions. In order to provide an accurate representation of a reservoir, data can be incorporated from a very large number of sources including physical surveys, seismographic surveys, and data from wells. Engineers often have very detailed data about the characteristics and properties of specific and discrete locations within the reservoir. During initialization, this data may be used to determine the total amount of fluids as well as fluid compositions and phase saturations in discrete cells. History matching may be performed after running a simulation by comparing numerical results (e.g., for well production rate, gas oil ratio, water-cut, etc.) against actual field data and adjustments may be made to the reservoir model to reduce discrepancies. Once a model is refined, it may be used to predict future well production rates and a well management strategy based on the simulated reservoir flow conditions may be designed that aims to optimize overall recovery or economic results.

Gridding is typically performed to discretize a reservoir into a finite number of cells in order to simulate the behavior of the reservoir. It is often the case that grid orientation, grid size and grid geometry has a large impact on the accuracy of a simulation. In general, to resolve pressure, saturation, or permeability variation across the reservoir, smaller grid cells need to be used where such variation is large. For example, cell sizes in the surroundings of a well may need to be small because of the usually large pressure drawdown at those locations.

Besides grid sizes, grid orientation and grid geometry may also have a strong impact on simulation results. To reduce grid orientation effect, for example, grids may be aligned along major reservoir geological features, such as facies or faults, as well as streamlines for fluid flows. With commonly used Cartesian grid using local refinements, it may be possible to generate grids with cells of varying sizes, but it may be difficult to align cells along geological features or flow streamlines. For isotropic permeability distributions and features that are horizontal or vertical, this grid orientation problem with Cartesian grid may be partially solved with the advent of a K-orthogonal grids where gridnodes can be distributed more or less freely in space to conform to reservoir geometry. For anisotropic and highly heterogeneous permeability fields, it is almost impossible to create K-orthogonal grids. Therefore, conventional two point flux approximation (TPFA), which computes the flux of a face between two adjacent gridblocks by piecewise linearly interpolating the grid cell pressures, may no longer be accurate or valid and multi-point flux approximation (MPFA) should be used. MPFA involves a larger stencil to calculate the flux and is recognized by researchers as a way to improve numerical accuracy.

With MPFA, formulas for calculating fluxes are first derived for single phase flows, and then generalized to multiphase phase flows by accounting for saturation effects on relative permeability. The goal in the derivation is to solve for a pressure gradient field in the reservoir which yields fluxes that are consistent across interfaces between grid cells. To compute the pressure gradient in 2D, interaction regions are constructed around each vertex of the grid by joining the center of each grid cell sharing the vertex with centers of the cell edges that meet at the vertex. In 3D, interaction regions are created by constructing surfaces that are bounded by lines connecting block centers and face centers and lines connecting face centers and edge centers of cells around the vertex.

Computing a pressure gradient using MPFA may be described with reference to FIG. 1, which shows an exemplary set of adjacent grid cells $110_1$-$110_4$ sharing a common vertex O. An interaction region 120 is constructed by joining cell centers $C_1$-$C_4$ with centers $M_1$-$M_4$ of cell edges that meet at the vertex O. To facilitate discussion, each portion of an interaction region that is contained in one of the cells is referred to as a subvolume. For example, in FIG. 1, quadrilaterals $C_2M_1OM_2$, $C_3M_2OM_3$, C4M3OM4 and $C_1M_4OM_1$ are the four subvolumes of the interaction region 120.

With conventional MPFA, the pressure gradient is assumed constant in each subvolume and is obtained by using first order Taylor expansion or linear interpolation based on the pressure value at the cell center ($C_i$, i=1 to 4) and those at the edge centers ($M_i$, i=1 to 4) of the same subvolume. Using the pressure gradient and Darcy's law, $$F = n^T \lambda K \nabla p \qquad (1)$$

fluxes may then be written in terms of the $p_{c_i}$ and $p_{e_k}$, where F is flux in feet per day, n is the normal vector, $\lambda$ is the fluid mobility in 1/cp, K is a permeability tensor in millidarcys, $\nabla$ is the gradient operator in 1/ft and p is pressure in pounds per square inch. Though not written explicitly, a unit conversion factor of 0.00633 may be used on the right hand side to convert md-psi/ft-cp to ft/day. By balancing fluxes across each half-edge inside the interaction region ($M_1M_2$, $M_2M_3$, $M_3M_4$, and $M_4M_1$), a formula for pressure at any point $p_{e_k}$ may be derived as linear functions of $p_{c_i}$. Upon substitution, these equations may yield expressions for fluxes as linear functions of all pressure values at grid cell centers. The exact forms of these linear relationships may depend on the selected cell geometry and permeability tensors on grid cells surrounding the subvolume. In reservoir simulation, pressures at block centers may then be solved to determine the flows and state of the system.

In general, with MPFA the increase in computational cost when compared to TPFA is relatively small but results are shown to be more accurate, as expected. However, it has been observed that MPFA could result in severe unphysical oscillations in numerical solutions for single phase pressure equation $$-\nabla \cdot K \nabla p = g \qquad (2)$$

if the permeability field is strongly anisotropic, where g is a source/sink term and a constant mobility of 1 is assumed to simplify the notations. These numerical oscillations may be linked to the lack of monotonicity in the solution matrix for the discretization problem and efforts have been made to improve MPFA so that matrix monotonicity can be restored. In any case, the possible occurrence of these oscillations may pose a severe limitation to the use of MPFA in many applications.

Accordingly, what is needed is an improved method for approximating flux gradients.

SUMMARY OF THE INVENTION

Embodiments of the present invention generally provide methods and apparatus for making multi-point flux approximations.

For some embodiments, more accurate methods for calculating the pressure gradient and fluxes across discrete areas or volumes within a petroleum reservoir model are provided. Harmful oscillations in numerical solutions may be reduced by the introduction of additional unknown parameters (e.g., unknown pressures) in the interaction region. The addition of one or more unknown parameters allow the construction of a continuous pressure interpolation within a particular interaction region through the use of piecewise linear or piecewise bilinear, or trilinear in 3D, techniques.

In one embodiment, a method of modeling flow of a fluid within a reservoir is described. The method includes dividing the reservoir into a finite number of grid cells that forms a grid of the reservoir; defining interaction regions contained within adjacent grid cells in the grid; and performing enriched multipoint flux approximation operations that allow continuous pressure interpolation within one of the interaction regions by introducing at least one unknown pressure parameter within the one of the interaction regions.

In another embodiment, a method of predicting flow in a reservoir is described. The method includes (a) dividing a reservoir into a finite number of grid cells that forms a grid of the reservoir; (b) defining interaction regions contained within adjacent grid cells in the grid; (c) generating a linear system of equations in terms of global pressure parameters by performing enriched multipoint flux approximation operations that allow continuous pressure interpolation within multiple interaction regions by introducing at least one unknown pressure parameter within each of the multiple interaction regions; and (d) solving the linear system of equations.

In yet another embodiment, a computer-readable storage medium containing executable instructions is described. The computer-readable storage medium which is executed by a processor, performs operations for enriched multipoint flux approximation when executed. The executable instructions comprise (a) defining interaction regions contained within adjacent grid cells of a finite number of grid cells that form a grid dividing a reservoir; and (b) generating a linear system of equations in terms of global pressure parameters by performing enriched multipoint flux approximation operations that allow continuous pressure interpolation within multiple interaction regions by introducing at least one unknown pressure parameter within each of the multiple interaction regions.

In another alternative embodiment, a method for predicting one or more flow-based material properties of a reservoir is described. The method comprises dividing the reservoir into a finite number of grid cells that forms a grid of the reservoir; defining an interaction region contained within adjacent grid cells in the grid; deriving a set of equations for interpolation of a parameter within the interaction regions in terms of at least five unknown values of the parameter local to the interaction region, including at least one unknown parameter within the interaction region; deriving, from the set of interpolation equations, a system of equations in terms of global unknown parameters; and solving the system of equations to predict the one or more flow-based material properties.

In another embodiment, a method for predicting the pressure gradient in a reservoir is described. This method comprises dividing the reservoir into a finite number of grid cells that forms a grid of the reservoir; defining an interaction region contained within adjacent grid cells in the grid; deriving a set of equations for pressure interpolation within the interaction regions in terms of at least five unknown pressure parameters local to the interaction region, including at least one unknown pressure parameter within the interaction region; deriving, from the set of pressure interpolation equations, a system of equations in terms of global unknown pressure parameters; and solving the system of equations to predict the pressure gradient in the reservoir.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION OF THE PREFERRED EMBODIMENT

Embodiments of the present invention generally provide a method, apparatus, and system that may be used to reduce or eliminate numerical oscillations in solutions that occur when using conventional MPFA. The technique may be referred to as enriched multi-point flux approximation (EMPFA).

EMPFA, as described herein, may be used in a variety of applications, such as modeling general single or multiphase flows using various fluid models (e.g., black oil or equation-of-state or other compositional) in 2-dimensional (2D) or 3-dimensional (3D) reservoir models. EMPFA may be used to model the convective flow of energy. Further, EMPFA may be applied to Cartesian, Voronoi, or even arbitrary grids. In one particular application, EMPFA may be used to improve the consistency and accuracy in constructing pressure interpolations in grid cells for the purpose of determining flux equations used in predicting flow in a reservoir.

As previously described, with the conventional MPFA method, a pressure gradient is treated as constant inside each subvolume of an interaction region based on linear interpolation of pressure at the block center and the two neighboring edge centers, which may give rise to an inconsistency in that the linearly interpolated pressure may be discontinuous across each half-edge shared by adjacent subvolumes. EMPFA may overcome this deficiency by introducing more degrees of freedom within the interaction region (e.g., at the vertex inside each interaction region), which may allow for continuous pressure interpolation within the interaction region and more accurate flux approximation.

Thus, EMPFA techniques described herein may be used to advantage in any type of application that might benefit from more accurate pressure or flux approximations. Such applications include, but are not limited to, scale-up, modeling of dispersion/diffusion, and coupling of material and energy flows in thermal simulation.

To facilitate understand the following description will refer to determining fluxes in a petroleum reservoir modeling system as a specific, but not limiting, example of a useful application of EMPFA. However, those skilled in the art will recognize that the method and device described herein and/or utilized in the manner described herein may be used in a wide variety of applications of numeric models.

An Exemplary Method for Enriched Multipoint Flux Approximation

Figure 2:
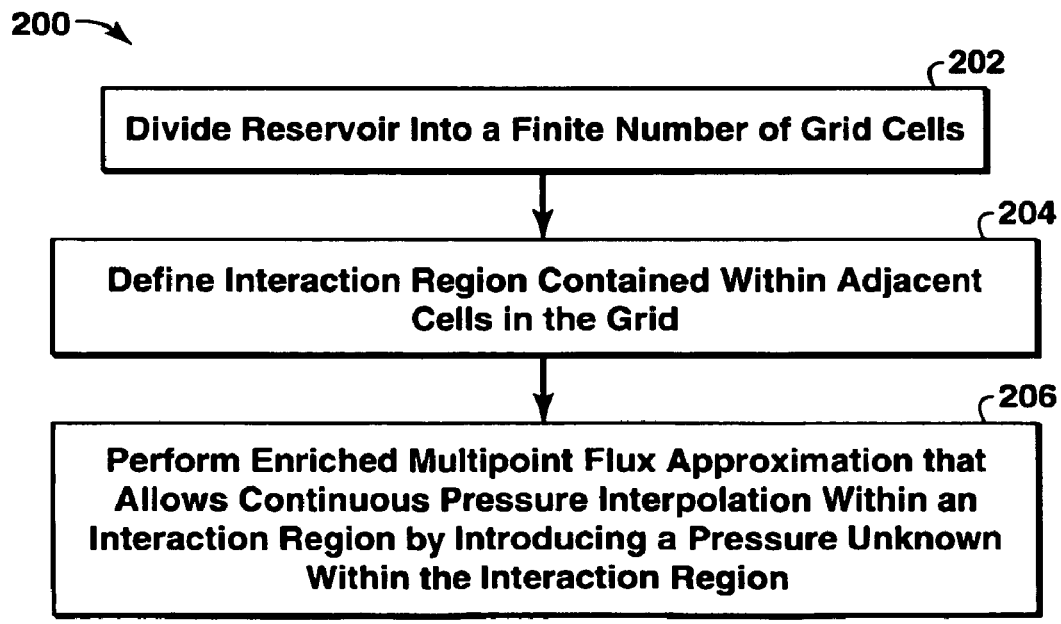
FIG. 2 is a flow diagram of exemplary operations for performing Enriched Multi-Point Flux Approximation (EMPFA), in accordance with embodiments of the present invention.

FIG. 2 is a flow diagram 200 of exemplary operations 200 that may be performed to accurately calculate fluxes at interfaces of grid cells, in accordance with embodiments of the present invention. The operations may be performed, for example, in an effort to obtain a series of flux equations for all cell interfaces (e.g., in terms of pressures at cell centers) that may be used in a global effort to predict flow in a reservoir model.

The operations begin, at block 202, by dividing a reservoir into a finite number of grid cells. At block 204, an interaction region contained within adjacent cells in the grid is defined. As previously described, the cells may be designed with varying cell size, cell boundary geometry, and orientation (e.g., K-orthogonal grid where grid nodes (corners) can be distributed more or less freely in space to conform to reservoir geometry) that may aid in accurate simulation.

At block 206, enriched multipoint flux approximation (EMPFA) that allows continuous pressure interpolation within an interaction region by introducing a additional pressure unknown within the interaction region (e.g., at the vertex) is performed. By allowing continuous interpolation within the interaction region, EMPFA may eliminate or reduce numerical oscillations linked to the conventional MPFA. Equations for continuous interpolation within the interaction region may be derived utilizing a variety of different techniques that utilize unknown pressures at edge centers of an interaction region and an additional pressure within the interaction region, such as at the vertex.

For example, for one embodiment, piecewise bilinear approximation techniques may be used to derive a set of equations. With piecewise bilinear approximation, a pressure field may constructed for each sub-volume of an interaction region in two steps. First, the quadrilateral defining a sub-volume (in x-y coordinate space) may be mapped to a standard reference square (1×1) element in a different coordinate space.

Figure 3A:
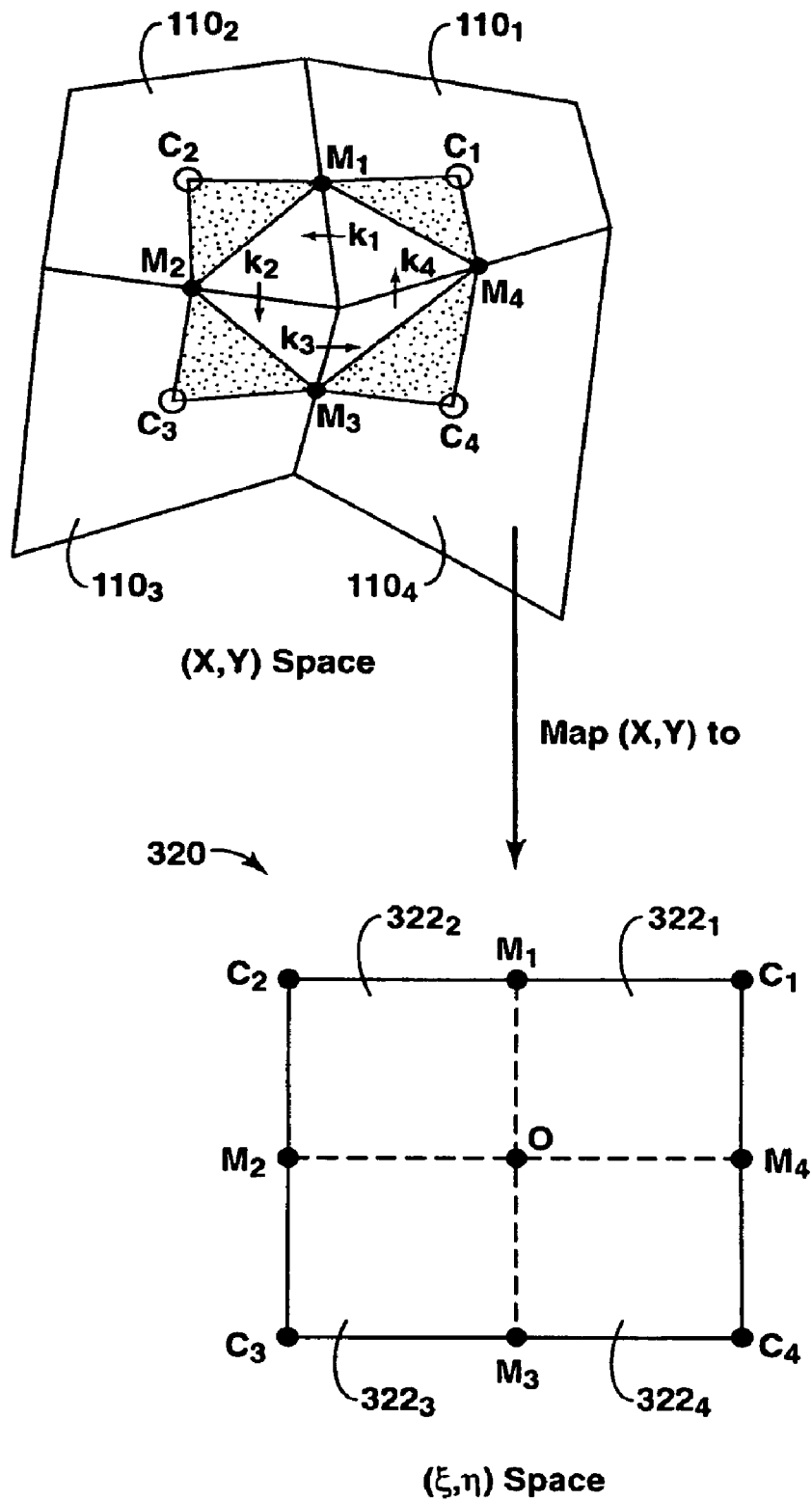
FIGS. 3A and 3B illustrate an exemplary integration region and subvolumes constructed for performing EMPFA, in accordance with embodiments of the present invention.
Figure 3B:
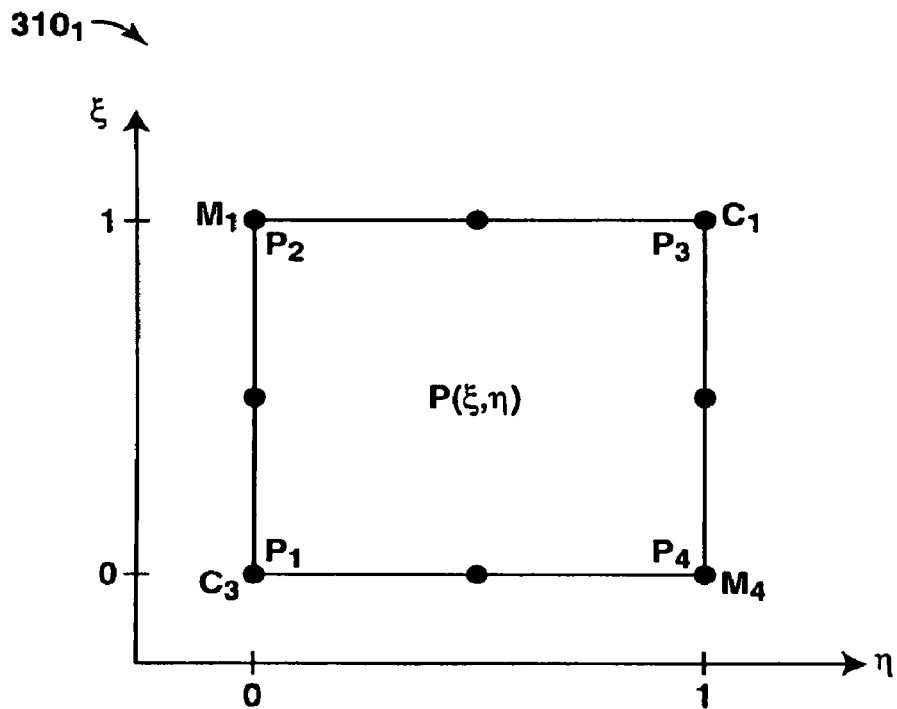

FIGS. 3A and 3B illustrate the mapping of sub-volumes of an interaction region 120 in an x-y coordinate space to reference square (1×1) sub-volumes $322_1$-$322_4$ of an interaction region 320 in a different ($\xi$, $\eta$) coordinate space. The sub-volumes may be mapped via the following equations:

$$\begin{cases} x = x_1 + (x_2 - x_1)\xi + (x_3 - x_1)\eta + (x_4 - x_3 - x_2 + x_1)\xi\eta \\ y = y_1 + (y_2 - y_1)\xi + (y_3 - y_1)\eta + (y_4 - y_3 - y_2 + y_1)\xi\eta \end{cases} \quad (3)$$

where $(x_1, y_1)$, $(x_2, y_2)$, $(x_3, y_3)$, and $(x_4, y_4)$ are x-y coordinates of the four quadrilateral corner points of the sub-volume (e.g., $C_1$, O, $M_1$, and $M_4$, respectively, for the sub volume $310_1$ shown mapped in FIG. 3B).

Subsequently, for each (mapped) square sub-volume, a bilinear pressure equation may be defined as follows:

$$p(\xi,\eta)=p_1(1-\xi)(1-\eta)+p_2\xi(1-\eta)+p_3\xi\eta+p_4(1-\xi)\eta \quad (4)$$

where $p_1$, $p_2$, $p_3$ and $p_4$ are pressure values at the four corners of the quadrilateral (e.g., $C_1$, O, $M_1$, and, $M_4$, respectively). The pressure function $p(\xi, \eta)$ defined by Eq. (4) becomes a function of $p(x, y)$ on the quadrilateral when combined with the mapping in Eq. (3). While the exact form of pressure in terms of x and y variables derived by these equations, $p(x, y)$, may be relatively complicated, it can be verified that on each side of the quadrilateral, $p(x, y)$ is linear along the edge.

Thus, $p(x, y)$ along a common edge is uniquely determined by the pressure values at the two endpoints, which means $p(x, y)$ from bilinear interpolations on neighboring subvolumes are the same along the common edge. In other words, pressure from this bilinear approximation is continuous within the entire interaction region.

For one embodiment, piecewise linear approximation techniques may be used to derive a set of equations used to generate a continuous pressure interpolation within an interaction region. With piecewise linear approximation, each subvolume in an interaction region may be first divided into two parts by a line joining the vertex to the block center.

Figure 1:
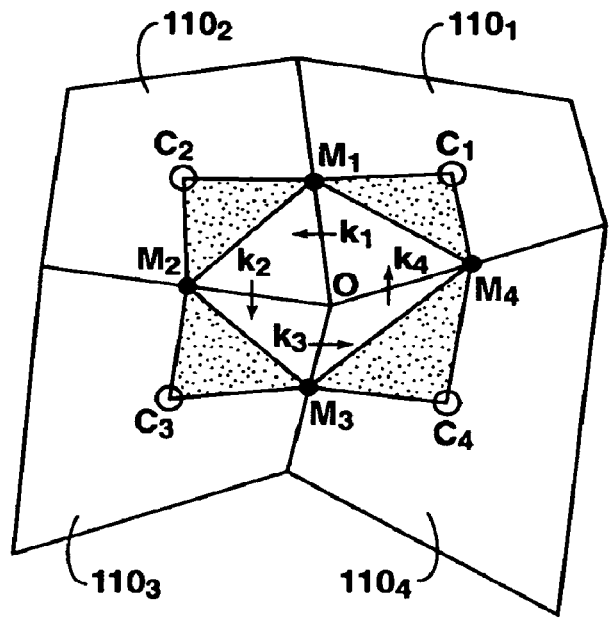
FIG. 1 illustrates an exemplary interaction region and corresponding subvolumes used in conventional Multi-Point Flux Approximation (MPFA).
Figure 4:
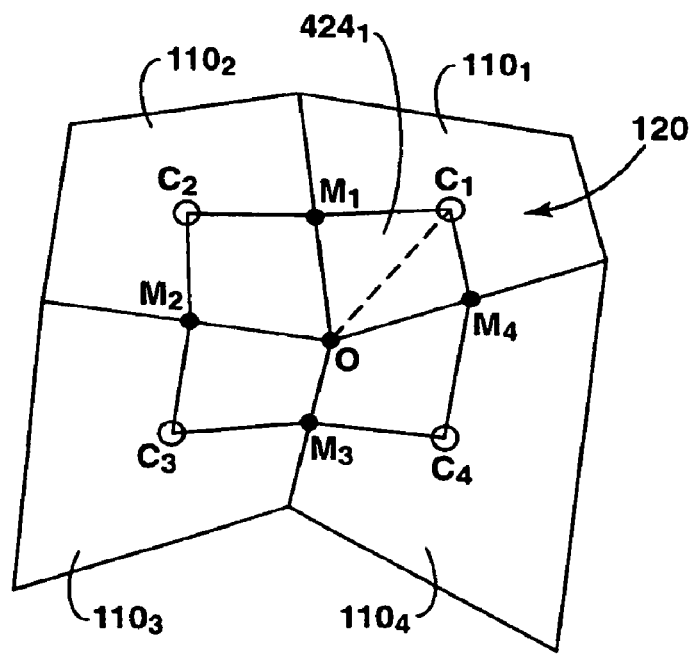
FIG. 4 illustrates an exemplary integration region and subvolumes constructed for performing EMPFA, in accordance with embodiments of the present invention.

For example, referring to FIG. 4, subvolume $C_1M_4OM_1$ may be divided into triangles $C_1OM_1$ (reference number $424_1$) and triangle $C_1OM_4$ by line $C_1O$. Within each triangle, pressure is assumed linear and is interpolated from pressure values at the three corners, which each include the vertex, a block center, and an edge center. For example, pressure inside triangle $C_1OM_1$ in FIG. 1 may be interpolated from pressure values at points $C_1$, $O$, and $M_1$, from the following equation:

$$p(x, y) = \frac{p_1(x_2y_3 - x_3y_2) + p_2(x_3y_1 - x_1y_3) + p_3(x_1y_2 - x_2y_1)}{(x_2 - x_3)(y_1 - y_2) - (x_1 - x_2)(y_2 - y_3)} - \frac{(p_1 - p_2)(y_2 - y_3) - (p_2 - p_3)(y_1 - y_2)}{(x_2 - x_3)(y_1 - y_2) - (x_1 - x_2)(y_2 - y_3)}x + \frac{(p_1 - p_2)(x_2 - x_3) - (p_2 - p_3)(x_1 - x_2)}{(x_2 - x_3)(y_1 - y_2) - (x_1 - x_2)(y_2 - y_3)}y \quad (5)$$

where $p_1$, $p_2$, and $p_3$ are pressure values at $C_1$, $O$, and $M_1$, respectively, and $(x_1, y_1)$, $(x_2, y_2)$, and $(x_3, y_3)$ are the x-y coordinates of those points.

The linearity of the interpolation implies pressure along each half edge is dependent only on the pressure values at the two endpoints of the line, and so is independent of the triangle from which the linear approximation is constructed. For example, linear interpolation on triangle $C_1OM_1$ and that on triangle $C_2OM_1$ yield the same result along half edge $OM_1$. Because of this, pressure derived from piecewise linear approximation is continuous inside the interaction region. Across boundaries between different interaction regions, however, pressure thus interpolated may not be continuous because the procedure to balance fluxes within neighboring regions may produce different pressure values for the corresponding edge centers.

The intermediate unknown pressures at the edge centers and at the vertex introduced for EMPFA, independently of the techniques used (e.g., piecewise linear or bilinear) above, may be eliminated so that equations for pressure gradient and the fluxes can be expressed in terms of system unknown parameters only, such as pressure at grid cell centers. To eliminate the intermediate unknown pressures at the edge centers, flux balance equations may be derived for each half edge of the interaction region.

As the first step of this approach, fluxes may be calculated from Darcy's law for each subvolume, for example, based on the pressure interpolation schemes introduced earlier. With piecewise linear or piecewise bilinear interpolation, a pressure gradient equation can be written in terms of pressure values at block centers, edge centers, and the vertex. Substitution of this pressure gradient equation into Eq. (1) above ($F=n^T(K/\mu)\nabla p$) yields an equation of the following form:

$$F = \sum_i \alpha_i^c p_{c_i} + \sum_k \alpha_k^e p_{e_k} + \alpha^v p_o \quad (6)$$

where subscript i is an index (1-4) for cell centers, and k is an index for edge centers.

At each half edge, balancing fluxes calculated from the two subvolumes (identified below with symbols + and −) on either side of the edge yields the equation:

$$\sum_i \alpha_i^{c+} p_{c_i} + \sum_k \alpha_k^{e+} p_{e_k} + \alpha^{v+} p_o = \sum_i \alpha_i^{c-} p_{c_i} + \sum_k \alpha_k^{e-} p_{e_k} + \alpha^{v-} p_o \quad (7)$$

For piecewise linear approximation, K, $\nabla p$, and F are constant along the edge. As a result, the flux balance equation applies for every point along the edge. For piecewise bilinear approximation, however, K is constant but $\nabla p$ and F are not. As a result, flux balance holds only at the edge centers. In any case, to eliminate the pressure unknown at the vertex ($p_o$) introduced for the EMPFA techniques described above, an additional equation may be constructed. Several different techniques based on a single phase and steady state pressure equation may be used for this construction.

For one embodiment, an integration of flow within the interaction region may be applied. With this approach, integration may be performed on each side of the pressure equation (2) above, $-\nabla \cdot K \nabla p = g$, over the interaction region. This integration may be expressed by the following equation:

$$-\int_{\partial\Omega} n^T K \nabla p \, dS = \int_\Omega g \, dV \quad (8)$$

where $\partial\Omega$ is the boundary of the interaction region $\Omega$. Expressing $\nabla p$ as a linear combination of $p_{c_i}$, $p_{e_k}$ and $p_o$ and substituting it into Eq. (8) yields the desired equation, which can be written in the following form:

$$\sum_i \beta_i^c p_{c_i} + \sum_k \beta_k^e p_{e_k} + \beta^v p_o = \psi \quad (9)$$

where constants $\beta^c$, $\beta^e$, and $\beta^v$ are functions of the permeability tensor.

Another approach to generate equations to eliminate intermediate unknown pressures is to apply a 2D vertex limit flow integration. With this approach, integration is still performed with each side of the equation as with the 2D flow integration approach described above, but only on a subdomain, $\Omega_\epsilon$, of the interaction region $\Omega$, which may be expressed by the following equation:

$$-\int_{\partial\Omega_\epsilon} n^T K \nabla p \, dS = \int_{\Omega_\epsilon} g \, dV \quad (10)$$

Figure 5:
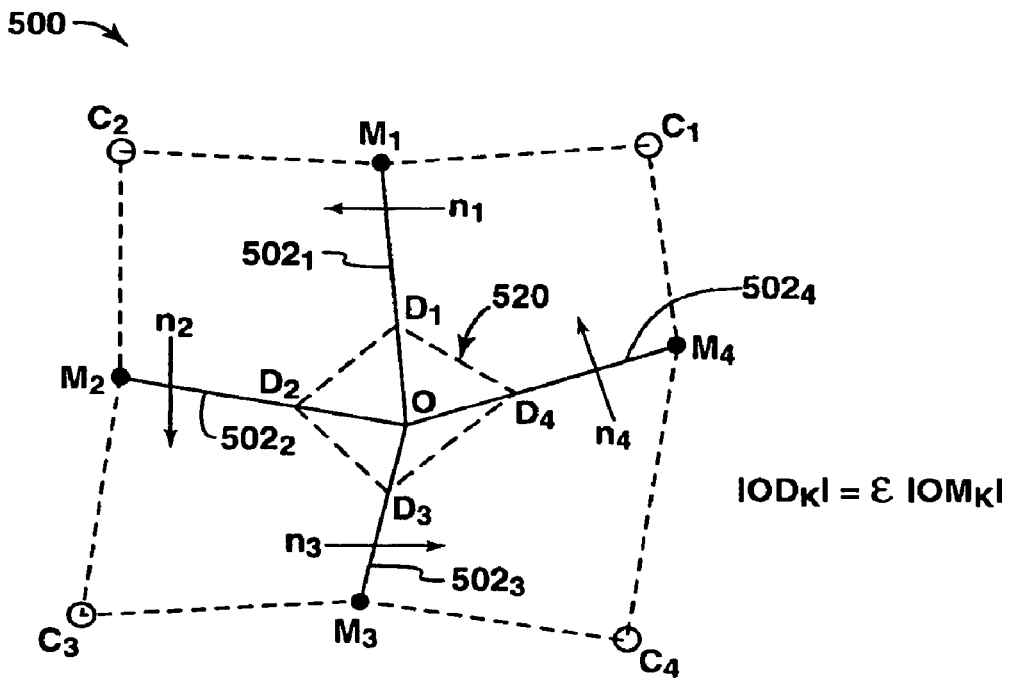
FIG. 5 illustrates an exemplary integration region and subvolumes constructed for performing EMPFA, in accordance with embodiments of the present invention.

The sub domain $\Omega_\epsilon$ may be constructed by connecting points, $D_k$, on each half edge, with the condition that the distance between each point $D_k$ and the vertex is proportional to the length of the edge ($|OD_k|=\epsilon|OM_k|$). This is illustrated in FIG. 5, which illustrates an exemplary subdomain 520 of an interaction region 500 formed by connection points $D_1$-$D_4$ on half edges $502_1$-$502_4$, respectively, of the interaction region 500.

Writing $\nabla p$ in terms of $p_{c_i}$, $p_{e_k}$ and $p_o$ again, Eq. (10) yields the equation:

$$\varepsilon\left(\sum_i \beta_i^{c^*} p_{c_i} + \sum_k \beta_k^{e^*} p_{e_k} + \beta^{v^*} p_o\right) + O(\varepsilon^2) = \int_{\Omega_\varepsilon} g \, dV \quad (11)$$

Assuming that g is bounded or unbounded but square integratable, it can be shown that the right hand side (RHS) of Eq. (11) above reduces to o($\epsilon$). Dividing both sides of the equation by $\epsilon$ and taking the limit as E approaches zero ($\epsilon \to 0$), yields an equation that can be used to solve for the pressure at the vertex $p_o$:

$$\sum_i \beta_i^{c^*} p_{c_i} + \sum_k \beta_k^{e^*} p_{e_k} + \beta^{v^*} p_o = 0 \quad (12)$$

Various numerical methods, such as local finite element methods (FEMs), may also be used in solving a single phase pressure equation. As an example, Equation (2) listed above may be solved in the interaction region by applying FEM, for example, with Dirichlet boundary conditions. From this FEM solution, the additional pressure unknown (e.g., the pressure at the vertex) can be expressed as a linear function of pressure values at the edge centers and block centers.

With the constraint equations derived above for pressure at edge centers and at the vertex, the intermediate pressure unknown parameters, $p_{e_k}$ and $p_o$, can be eliminated from the expression for fluxes given by Eq. (6). Thus, fluxes across each edge between neighboring grid cells can finally be obtained by summation with fluxes obtained in a similar manner from neighboring interaction regions, via the formula:

$$F = \sum_{i=1}^{n_c} \omega_i(K_1, K_2, \ldots, K_{n_c}) P_{c_i} \quad (13)$$

where the summation may be performed over all grid cells whose boundary intersects the edge.

For some embodiments, according to a least square pressure approximation method, a linear pressure function may be sought for each subvolume which borders the edge that best approximates (minimizing error) pressure values at the cell center and cell edge centers of a subvolume. Such a least square approach is described in greater detail below, with reference to a 3D subvolume.

Non-Matching Grid Cells

Figure 6:
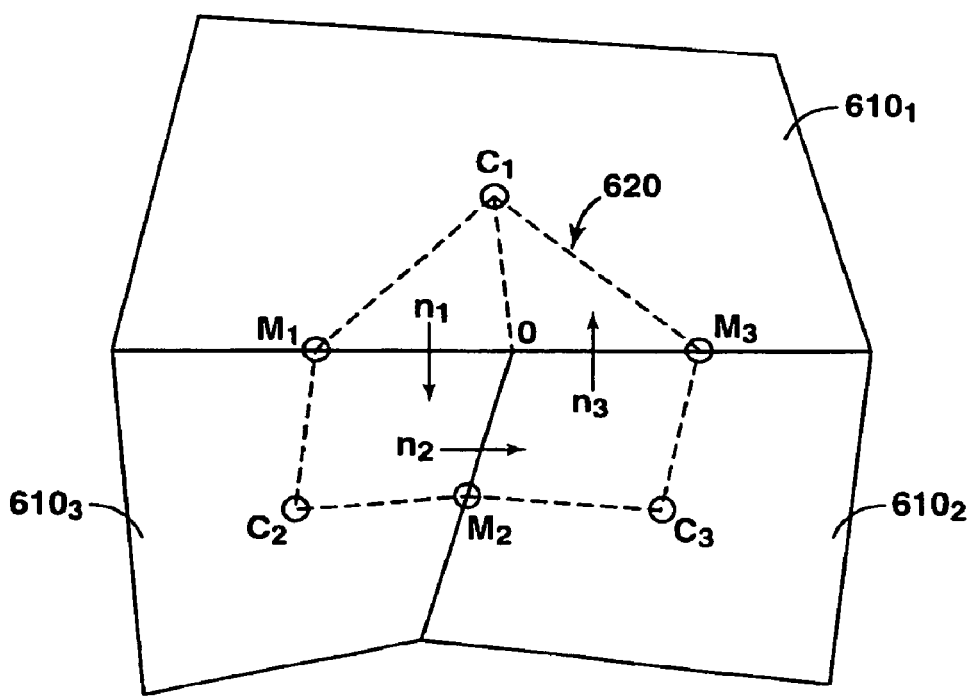
FIG. 6 illustrates an exemplary non-matching grid and corresponding integration region for performing EMPFA, in accordance with embodiments of the present invention.

For non-matching grid cells, piecewise linear and piecewise bilinear interpolations may be combined to compute the fluxes. FIG. 6 illustrates an exemplary interaction region 620, contained within non-matching grid cells $610_1$, $610_2$, and $610_3$. Since quadrilateral $C_1 M_1 O M_3$ is degenerate, it cannot be mapped to a standard square via a bilinear transform via Eq. 4 described above, without making O a singular point. However, triangle $C_1 M_1 M_3$ may be divided into two sub-triangles, on which linear interpolation may be applied. For non-degenerate sub-volumes, e.g., quadrilateral $C_2 M_1 O M_2$ and $C_3 M_2 O M_3$, either piecewise linear or bilinear interpolation can be used. With this mixed interpolation, the techniques described above for balancing the fluxes and for eliminating the intermediate unknown pressures may also be carried out for non-matching grids.

Extending EMPFA for 3D Reservoir Models
Pressure Interpolations in 3D

Figure 7:
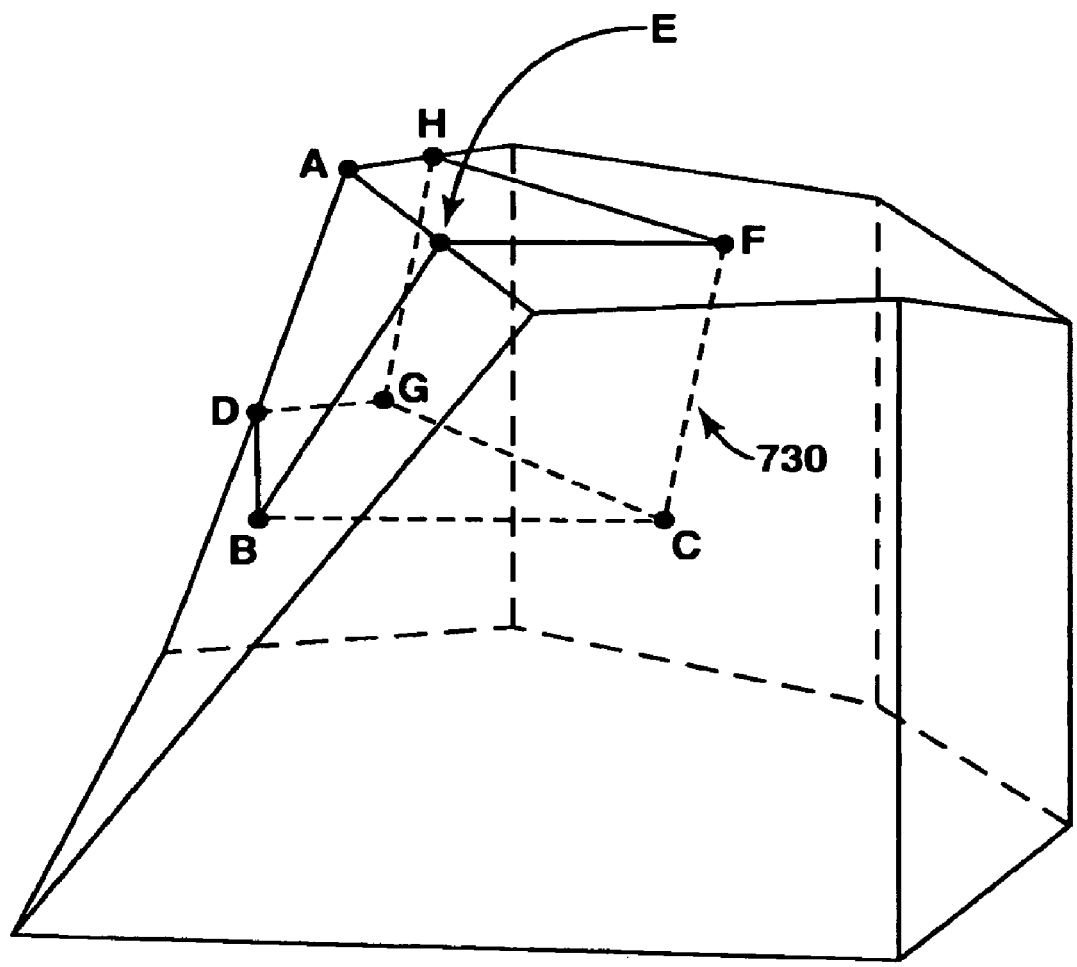
FIG. 7 illustrates an exemplary 3-D interaction region and subvolumes constructed for performing EMPFA, in accordance with embodiments of the present invention.
Figure 8A:
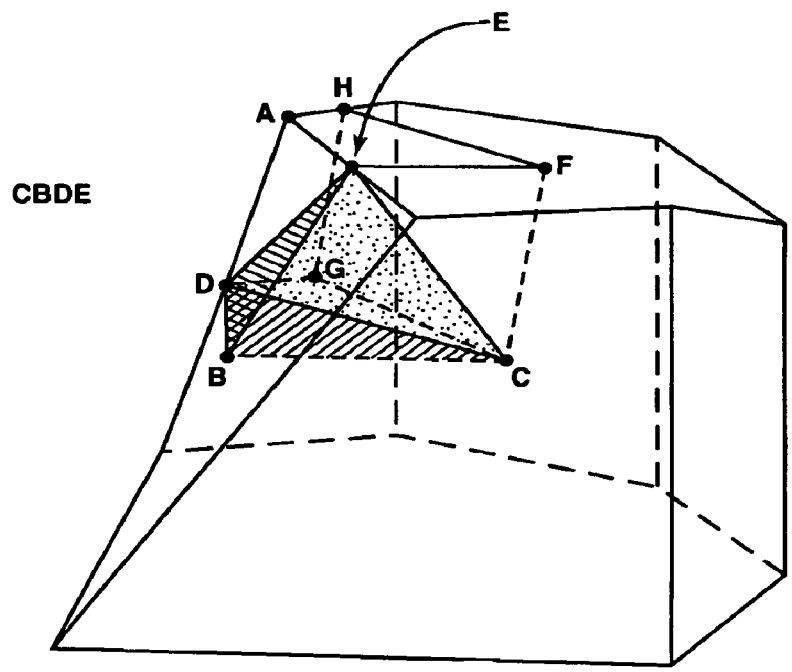
FIGS. 8A-8F illustrate exemplary subvolumes of the 3-D integration region shown in FIG. 7.
Figure 8B:
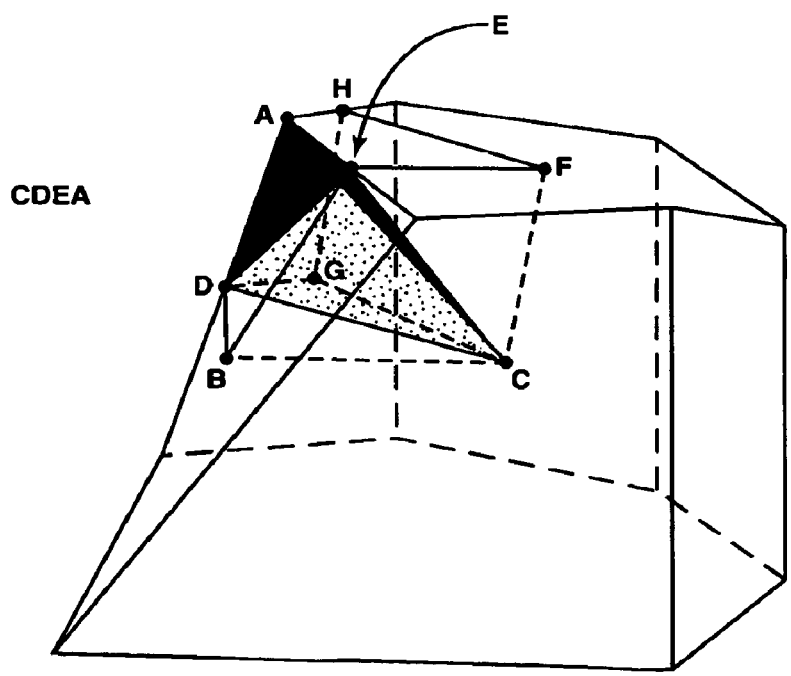
Figure 8C:
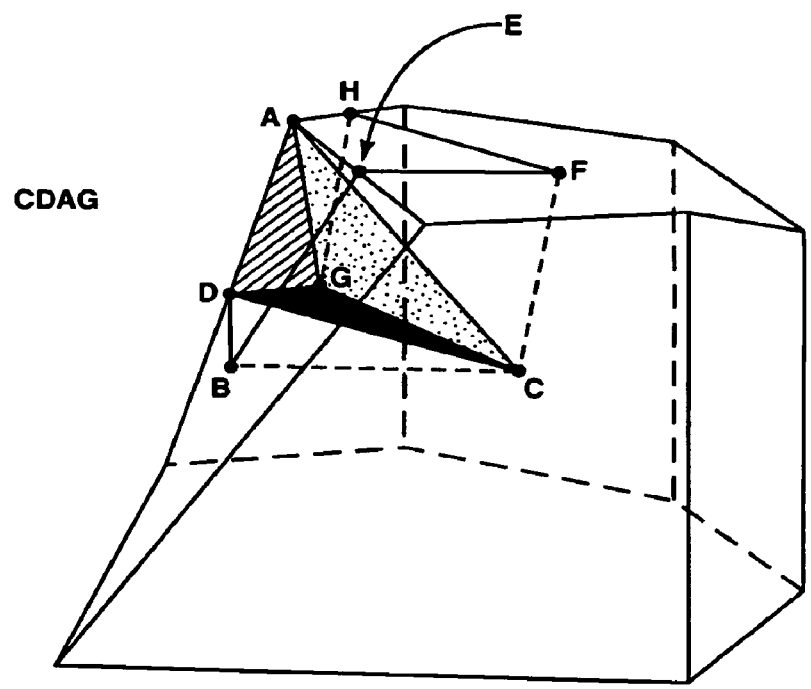
Figure 8D:
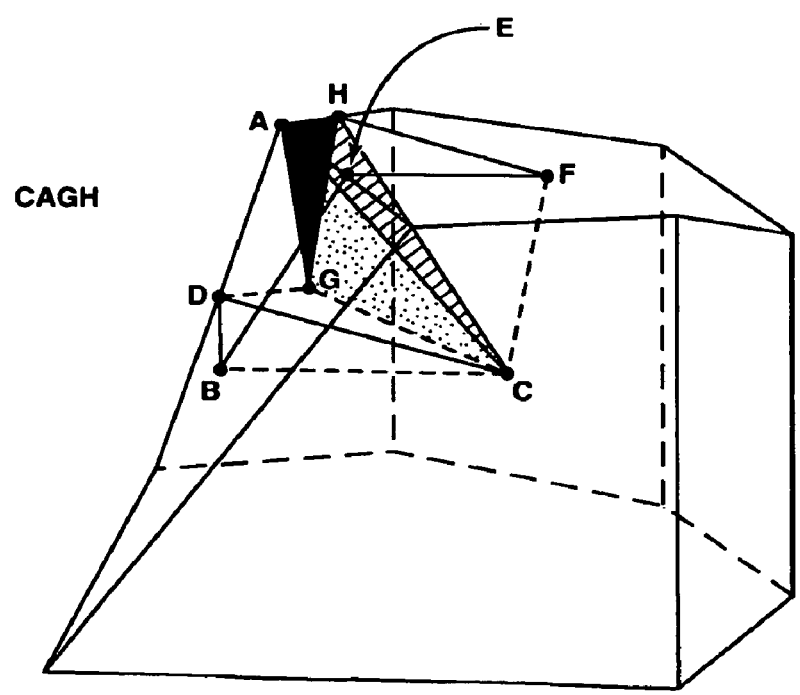
Figure 8E:
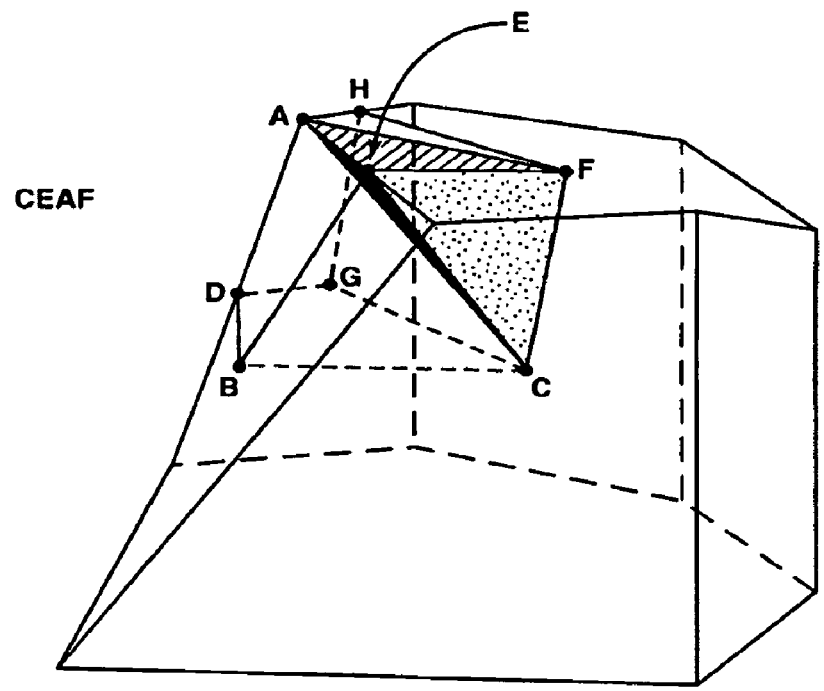
Figure 8F:
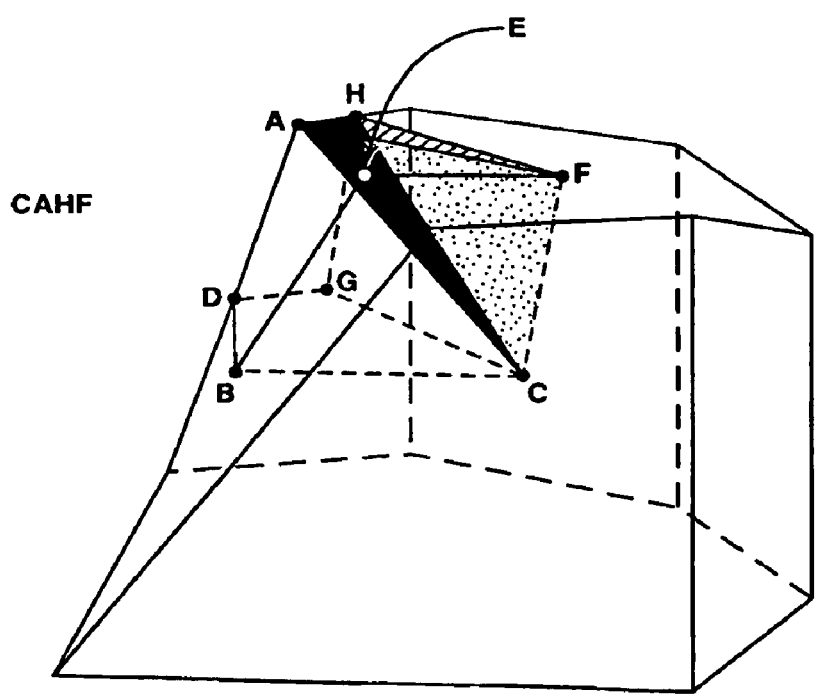

The EMPFA techniques described herein may be extended and applied to 3D grids. For 3D grids, subvolumes inside interaction regions may be represented as hexahedrons, as illustrated by the hexahedron 730 shown in FIG. 7. With each subvolume hexahedron, there are four types of corner points, namely, one block center, three face centers, three edge centers, and one vertex point. For the subvolume hexahedron 730 depicted in FIG. 7, point C is the block center, while points B, G, and F are face centers, points E, H, and D are edge centers, and point A is the vertex. This is in contrast to 2D grids, for which there are only three types of points which bound a subvolume: one block center, two edge centers, and one vertex.

The additional corner point type for subvolumes in 3D means additional intermediate unknown parameters may be needed in the flux calculations. Specifically, pressure interpolation may involve pressure values at block centers, pressure values at face centers, pressure values at edge centers, and a pressure value at the vertex. In a similar manner to that described above, these values may be treated as temporary unknown parameters, except the value at the block center. With these intermediate unknown parameters introduced, pressure interpolation can be carried out for 3D grids using various approaches in a similar manner as in the 2D case, as described below.

Analogous to piecewise bilinear approximation in 2D, piecewise trilinear approximation equations may be constructed for 3D grids. To construct trilinear pressure approximation equations, hexahedral subvolumes are first mapped to the unit cube, using trilinear functions:

$$\begin{cases} x = x_0 + x_\xi \xi + x_\eta \eta + x_\chi \chi + x_{\xi\eta}\xi\eta + x_{\xi\chi}\xi\chi + x_{\eta\chi}\eta\chi + x_{\xi\eta\chi}\xi\eta\chi \\ y = y_0 + y_\xi \xi + y_\eta \eta + y_\chi \chi + y_{\xi\eta}\xi\eta + y_{\xi\chi}\xi\chi + y_{\eta\chi}\eta\chi + y_{\xi\eta\chi}\xi\eta\chi \\ z = z_0 + z_\xi \xi + z_\eta \eta + z_\chi \chi + z_{\xi\eta}\xi\eta + z_{\xi\chi}\xi\chi + z_{\eta\chi}\eta\chi + z_{\xi\eta\chi}\xi\eta\chi \end{cases} \quad (14)$$

where ($\xi$, $\eta$, $\chi$) is in ([0, 1]×[0, 1]×[0, 1]). By constraining Eq. 14 to map the eight corners of a unit cube to the corners on the hexahedral subvolume, all unknown coefficients on the right hand side can be determined. Next, an equation to approximate pressure using the trilinear function may be constructed:

$$p(x,y,z) = p_1(1-\xi)(1-\eta)(1-\chi) + p_2\xi(1-\eta)(1-\chi) + p_3(1-\xi)$$
$$\eta(1-\chi) + p_4\xi\eta(1-\chi) + p_5(1-\xi)(1-\eta)\chi + p_6\xi(1-\eta)\chi +$$
$$p_7(1-\xi)\eta\chi + p_8\xi\eta\chi \quad (15)$$

With interpolations constructed in this manner, it is possible to verify that pressure values at points on each face are uniquely determined by pressure values at the four face corners. This property implies values from two different pressure interpolations on adjacent subvolumes are the same at the common interface, meaning pressure from trilinear interpolation is continuous within the entire interaction region.

To construct piecewise linear approximation in 3D, the hexahedral subvolume is divided into six tetrahedrons. For example, the hexahedral subvolume 730 shown in FIG. 7 may be divided into six tetrahedrons CBDE, CDEA, CDAG, CAGH, CEAF, and CAHF, as shown in FIGS. 8A-8F. This decomposition is still possible with an arbitrary grid where more than three faces can meet at the vertex, although the number of tetrahedrons may be greater than 6. In any case, within each tetrahedron, linear interpolation may be used to determine pressure, using the following equation:

$$p(x,y,z) = a_0 + a_x x + a_y y + a_z z \quad (16)$$

The zero and first order coefficients, $a_0$, $a_x$, $a_y$, and $a_z$, may be solved from pressure values at the four tetrahedron corner points. As an example, taking tetrahedron CBDE shown in FIG. 8A, the following linear system of equations may be used to determine values of $a_0$, $a_x$, $a_y$, and $a_z$:

$$\begin{cases} a_0 + x_C a_x + y_C a_y + z_C a_z = p_C \\ a_0 + x_B a_x + y_B a_y + z_B a_z = p_B \\ a_0 + x_D a_x + y_D a_y + z_D a_z = p_D \\ a_0 + x_E a_x + y_E a_y + z_E a_z = p_E \end{cases} \quad (17)$$

Similar to the application in 2D, it can be shown pressure constructed in this manner agrees at common interfaces between adjacent subvolumes and so the interpolation as a whole is continuous inside the entire interaction region.

Elimination of Intermediate Unknown Parameters in 3D

As with the application in 2D, a goal is to eliminate intermediate unknown pressures at the face centers, the edge centers, and at the vertex introduced for pressure interpolation above to allow fluxes to be expressed in terms of pressure at block centers. The procedure for constructing consistency or constraint equations may be carried out in a way similar to that for the 2D case. In the 3D case, however, more equations are needed because of the additional unknown parameters at edge centers.

For flux balance, pressure gradient is computed from linear or trilinear interpolation and then substituted into Darcy's law to obtain the following expression for fluxes:

$$F = \sum_i \alpha_i^c p_{c_i} + \sum_j \alpha_j^f p_{f_j} + \sum_k \alpha_k^e p_{e_k} + \alpha^v p_o \quad (18)$$

where $p_{c_i}$, $p_{f_j}$, $p_{e_k}$, and $p_o$ represent pressure values at cell centers, face centers, edge centers, and the vertex, respectively. Balancing the fluxes across the interfaces (with subvolumes on different sides of an interface denoted by + and − symbols) according to the following equation:

$$\sum_i \alpha_i^{c+} p_{c_i} + \sum_j \alpha_j^{f+} p_{f_j} + \sum_k \alpha_k^{e+} p_{e_k} + \alpha^{v+} p_o = \quad (19)$$
$$\sum_i \alpha_i^{c-} p_{c_i} + \sum_j \alpha_j^{f-} p_{f_j} + \sum_k \alpha_k^{e-} p_{e_k} + \alpha^{v-} p_o$$

gives $n_f$ constraint equations, where $n_f$ is the number of face centers.

Similar to 2D, an interaction region flow integration approach may be applied to construct a constraint equation for the pressure unknown at the vertex. Using this approach, both sides of Eq. (2) may be integrated over the entire interaction region, which gives a relation of form:

$$\sum_i \beta_i^c p_{c_i} + \sum_j \beta_j^f p_{f_j} + \sum_k \beta_k^e p_{e_k} + \beta^v p_o = \psi \quad (20)$$

Alternatively, a vertex limit flow integration may be performed on a sub-region $\Omega_\epsilon$ defined in a similar fashion as in the 2D case, letting $\epsilon$ goes to zero to get a homogeneous version of (20):

$$\sum_i \beta_i^{c*} p_{c_i} + \sum_j \beta_j^{f*} p_{f_j} + \sum_k \beta_k^{e*} p_{e_k} + \beta^{v*} p_o = 0 \quad (21)$$

Different techniques may be applied to eliminate intermediate unknown pressures at edge centers by constructing constraint equations. For example, according to a least square pressure approximation method, a linear pressure function may be sought for each subvolume which borders the edge that best approximates (minimizing error) pressure values at the block center and block face centers of the subvolume. For example, for edge center E in FIG. 7 a linear function as that in (16) may be defined to approximate pressure values at block center C and face centers B, F and G. When there are only four pressure values to approximate, the desired function is just a linear interpolation. However, when the number of pressure values is more than four, which may be the case if more than three faces of the control volume meet at the vertex, minimizing the square sum of errors may be accomplished via the following equation:

$$\delta(a_0, a_x, a_y, a_z) = (a_0 + a_x x_c + a_y y_c + a_z z_c - p_c)^2 + \quad (22)$$
$$\sum_j (a_0 + a_x x_{f_j} + a_y y_{f_j} + a_z z_{f_j} - p_{f_j})^2$$

The summation above is over all cell and face centers within the same subvolume as the edge center. Minimizing $\delta$ leads to the following linear system of equations:

$$\begin{cases} \left(x_c + \sum_j x_{f_j}\right) a_0 + \left(x_c^2 + \sum_j x_{f_j}^2\right) a_x + \left(x_c y_c + \sum_j x_{f_j} y_{f_j}\right) a_y + \left(x_c z_c + \sum_j x_{f_j} z_{f_j}\right) a_z = x_c p_c + \sum_j x_{f_j} p_{f_j} \\ \left(y_c + \sum_j y_{f_j}\right) a_0 + \left(y_c x_c + \sum_j y_{f_j} x_{f_j}\right) a_x + \left(y_c^2 + \sum_j y_{f_j}^2\right) a_y + \left(y_c z_c + \sum_j y_{f_j} z_{f_j}\right) a_z = y_c p_c + \sum_j y_{f_j} p_{f_j} \\ \left(z_c + \sum_j z_{f_j}\right) a_0 + \left(z_c x_c + \sum_j z_{f_j} x_{f_j}\right) a_x + \left(z_c y_c + \sum_j z_{f_j} y_{f_j}\right) a_y + \left(z_c^2 + \sum_j z_{f_j}^2\right) a_z = z_c p_c + \sum_j z_{f_j} p_{f_j} \\ (1 + n_j) a_0 + \left(x_c + \sum_j x_{f_j}\right) a_x + \left(y_c + \sum_j y_{f_j}\right) a_y + \left(z_c + \sum_j z_{f_j}\right) a_z = p_c + \sum_j p_{f_j} \end{cases} \quad (23)$$

where $n_f$ is the number of face centers involved in Eq. (23).

Solving (23) gives $a_0$, $a_x$, $a_y$ and $a_z$ as linear functions of $p_c$ and $p_{f_j}$ $$\begin{cases} a_0 = a_{0,c} p_c + \sum_j a_{0,f_j} p_{f_j} \\ a_x = a_{x,c} p_c + \sum_j a_{x,f_j} p_{f_j} \\ a_y = a_{y,c} p_c + \sum_j a_{y,f_j} p_{f_j} \\ a_z = a_{z,c} p_c + \sum_j a_{z,f_j} p_{f_j} \end{cases} \quad (24)$$

Substituting (24) into the original linear pressure function (16) yields the following equation:

$$p(x,y,z) = \left(a_{0,c} p_c + \sum_j a_{0,f_j} p_{f_j}\right) + \left(a_{x,c} p_c + \sum_j a_{x,f_j} p_{f_j}\right) + \left(a_{y,c} p_c + \sum_j a_{y,f_j} p_{f_j}\right) y + \left(a_{z,c} p_c + \sum_j a_{z,f_j} p_{f_j}\right) z \quad (25)$$

A final constraint equation from the direct approximation method may be obtained by setting pressure at the edge center equal to the average of $p(x, y, z)$ computed above from different subvolumes which share the half edge:

$$p_e = \frac{\sum_i \left(a_{0,c_i} p_{c_i} + \sum_j a_{0,f_{i,j}} p_{f_{i,j}}\right) + \left(a_{x,c_i} p_{c_i} + \sum_j a_{x,f_{i,j}} p_{f_{i,j}}\right) x_e + \left(a_{y,c_i} p_{c_i} + \sum_j a_{y,f_{i,j}} p_{f_{i,j}}\right) y_e + \left(a_{z,c_i} p_{c_i} + \sum_j a_{z,f_{i,j}} p_{f_{i,j}}\right) z_e}{n_c} \quad (26)$$

where subscript i indicates different subvolumes. It may be noted that the constraint equation above, as well as those from balancing fluxes or integration of pressure equation, are linear relationships between $p_{c_i}$, $p_{f_j}$, $p_{e_k}$ and $p_o$. As a result, the intermediate unknown parameters of EMPFA in 3D can be eliminated with a linear solution, as is the case for 2D problems. Instead of minimizing errors for subvolumes individually and subsequently averaging the pressures as described above, it is also possible to derive constraint equations for $p_{e_k}$ by minimizing the square sum of errors which includes contributions from all subvolumes sharing the edge.

Edge volume flow integration is another approach that is similar to the integral method used for constructing the constraint equation for the pressure unknown at the vertex. For each pressure unknown at edge centers, the integration may be performed over a polyhedron with the vertices which include the vertex of the control volumes within the interaction region and all block centers on the same face of the interaction region as the edge center. To construct the gradient field, the polyhedron may be divided into several tetrahedrons, each of which may have two neighboring control volume centers, the vertex, and the center of the half edge as the vertices. For each polyhedron, linear interpolation may be used for pressure, from which pressure gradient are calculated and substituted into the integrated pressure equation.

With the constraint equations derived above for pressure at face centers, edge centers and at the vertex, all intermediate unknown pressures can be eliminated from the equation for fluxes within each interaction region. Similar to the 2D application, a final equation for fluxes across each interface of control volumes may then be obtained by combining those from interaction regions intersecting the interface.

Similar to the 2D approach described above, other numerical methods may also be used in solving a single phase pressure equation in 3D applications. For example, applying a local FEM approach, a local fine scale grid can be generated and more unknown pressures may be introduced in the interaction region. Equation (2) may be solved locally for each interaction region, for example, by a Galerkin finite element method (FEM) with Dirichlet boundary conditions. From this FEM solution, the additional unknown parameter (e.g., the pressure at the vertex) may be expressed as a linear function of pressure values at the edge centers and block centers.

Reservoir Simulations Using EMPFA

The equations for calculating fluxes derived from EMPFA can be used to model general multiphase fluid flows in reservoir, which are governed by the following mass and volume balance equations:

$$\begin{cases} \frac{dN_i^m}{dt} = \sum_v \sum_j A_j x_v^m F_{v,j} \\ V(p_i, N_1, N_2, \ldots, N_n) = V_p \end{cases} \quad (27)$$

where $N_i^m$ is the total mass of component m in block i, $x_v^m$ is the density of component m in phase v, $F_{v,j}$ is the flux in phase v across interface j of the block, $A_j$ the area of interface, and V and $V_p$ are fluid volume and pore volume of the block, respectively. Fluxes for multiphase flows can be calculated using a modified form of Eq. (13), the EMPFA flux formula for single phase flow, to account for saturation effects on the permeability and fluid viscosity:

$$F_{v,j} = \frac{k_{j,r,v}}{\mu_{j,v}} \sum_{i=1}^{n_c} \omega_i(K_1, K_2, \ldots, K_{n_c}) p_{c_i} \quad (28)$$

with $k_{j,r,v}$ and $\mu_{j,v}$ are the relative permeability (upstream weighted) and viscosity of phase v, respectively, on block upstream to interface j, while the summation is over all blocks involved in the flux calculations through interaction regions.

Thus, an exemplary procedure for performing reservoir simulation (which can involve a 2D or 3D model, with single phase or multiphase flow) using EMPFA may involve, after constructing a grid (which can be Cartesian, Voronoi, or arbitrary) and interaction regions, generating flux formulas for each interface (as shown in FIG. 2). As described herein, the resulting flux formulas for each interface may be in the form of a linear function of pressure at centers of blocks surrounding the interface, with the coefficients being rational functions of permeability (which can be isotropic or full tensors) in those blocks.

Thus, a linear system of equations in terms of primary system unknown parameters may be derived to predict flow in a reservoir by performing discretization in the time dimension on (27) and applying appropriate boundary conditions. Depending on the complexity of the flow being modeled, various levels of implicitness may be needed, so that the system unknown parameters may include only the implicit pressures (IMPES-IMplicit Pressure Explicit Satuations), or implicit pressure, followed by implicit saturation, then implicit moles (Sequential), or implicit pressure and phase saturation solved simultaneously (IMPSAT), or pressure and all moles may be solved simultaneous (Coupled Implicit). In any case, this linear system of equations may then be solved, for example, using direct or iterative software techniques (e.g., a linear solver). This time discretization may be described as iteratively performing the following set of operations at predetermined time periods to simulate flow in the reservoir.

For each fluid phase, calculate relative permeability on each grid block based on phase saturations. The flux formulas derived via EMPFA (using any of the techniques described herein) may be modified by accounting for saturation effects on the relative permeability, for example, via Eq. (28). Phase fluxes and necessary linearizations may be computed using the modified formula for each of the phases. Component fluxes and necessary linearizations may be computed from phase fluxes and phase compositions. The discretized form of the mass and volume balance equations (Eq. 27) may then be solved for each fluid component and each grid block in conjunction with a proper boundary condition. The pressure, masses, and saturations at each grid cell may then be updated based on these solutions. Optionally, this set of operations may be performed once per time step, or multiple times per time step, for example, until solutions converge.

Example simulations performed using the procedure described above were performed. The results of these simulations, presented below, validate the EMPFA approach and demonstrate its advantages over conventional MPFA. For simplicity, these simulations were performed assuming single phase, steady state flows, per Eq. (2) above.

Exact Solutions for Uniform Flows

Figure 9:
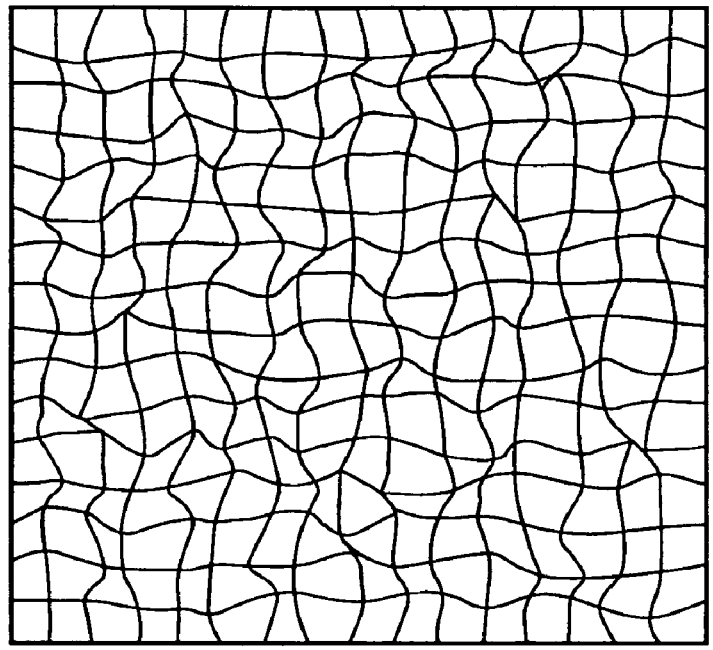
FIG. 9 illustrates a random grid generated by perturbing a Cartesian grid.

For any constant permeability field and boundary conditions prescribed by linear functions, the exact linear solution is recovered by EMPFA, using either piecewise linear or piecewise bilinear interpolation. This conclusion is true for 2D or 3D Cartesian grids, Voronoi grids, and pseudo-random (arbitrary) grids which can be generated by perturbing a uniform Cartesian grid with the condition that all control volumes remain convex. As an example, FIG. 9 illustrates an example arbitrary grid 900 of grid cells 910 generated by perturbing a Cartesian grid.

Equivalence of Methods for K-Orthogonal Grids

For K-orthogonal grids, where $n^T K$ at each interface is parallel to the edge of the interaction region intersecting the interface, EMPFA is equivalent to MPFA and TPFA. Considering the 2D case as an example, with K-orthogonal grids, fluxes on each half edge inside an interaction region are dependent only on pressure gradient along the edge of the interaction region. For EMPFA using linear or bilinear pressure interpolation, pressure is linear along that edge and, thus, the gradient is simply the pressure difference between the two end points divided by the length of the edge, which is the same for MPFA and TPFA. Consequently, all three approaches are equivalent under these conditions.

Elimination of Non-Physical Oscillations

Figure 10:
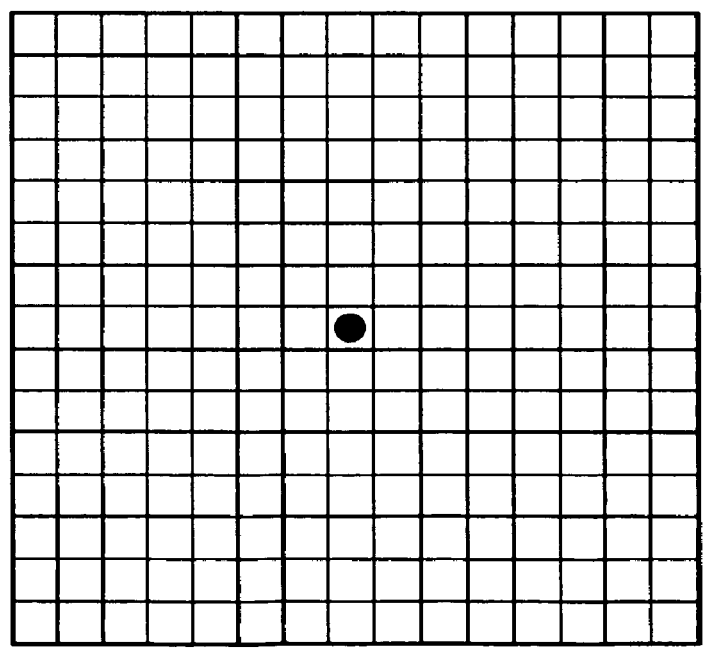
FIG. 10 illustrates a grid used for investigating numerical oscillations using EMPFA.

Testing indicates that EMPFA is superior to MPFA because solutions obtained using EMPFA are, unlike those produced by MPFA, well behaved and free of non-physical oscillations. As an example in 2D, $[-0.5, 0.5] \times [-0.5, 0.5]$ is selected as the computation domain and a quadrilateral grid 1000 as shown in FIG. 10 is generated. For this example, an isotropic permeability field is constructed by applying a rotation to a diagonal tensor $$K = \begin{pmatrix} \cos\varphi & \sin\varphi \\ -\sin\varphi & \cos\varphi \end{pmatrix} \begin{pmatrix} k_1 & 0 \\ 0 & k_2 \end{pmatrix} \begin{pmatrix} \cos\varphi & -\sin\varphi \\ \sin\varphi & \cos\varphi \end{pmatrix} \qquad (29)$$

where $\varphi$ is the angle of rotation and $k_1$ and $k_2$ are permeabilities in the x-y directions before the rotation.

Figure 11:
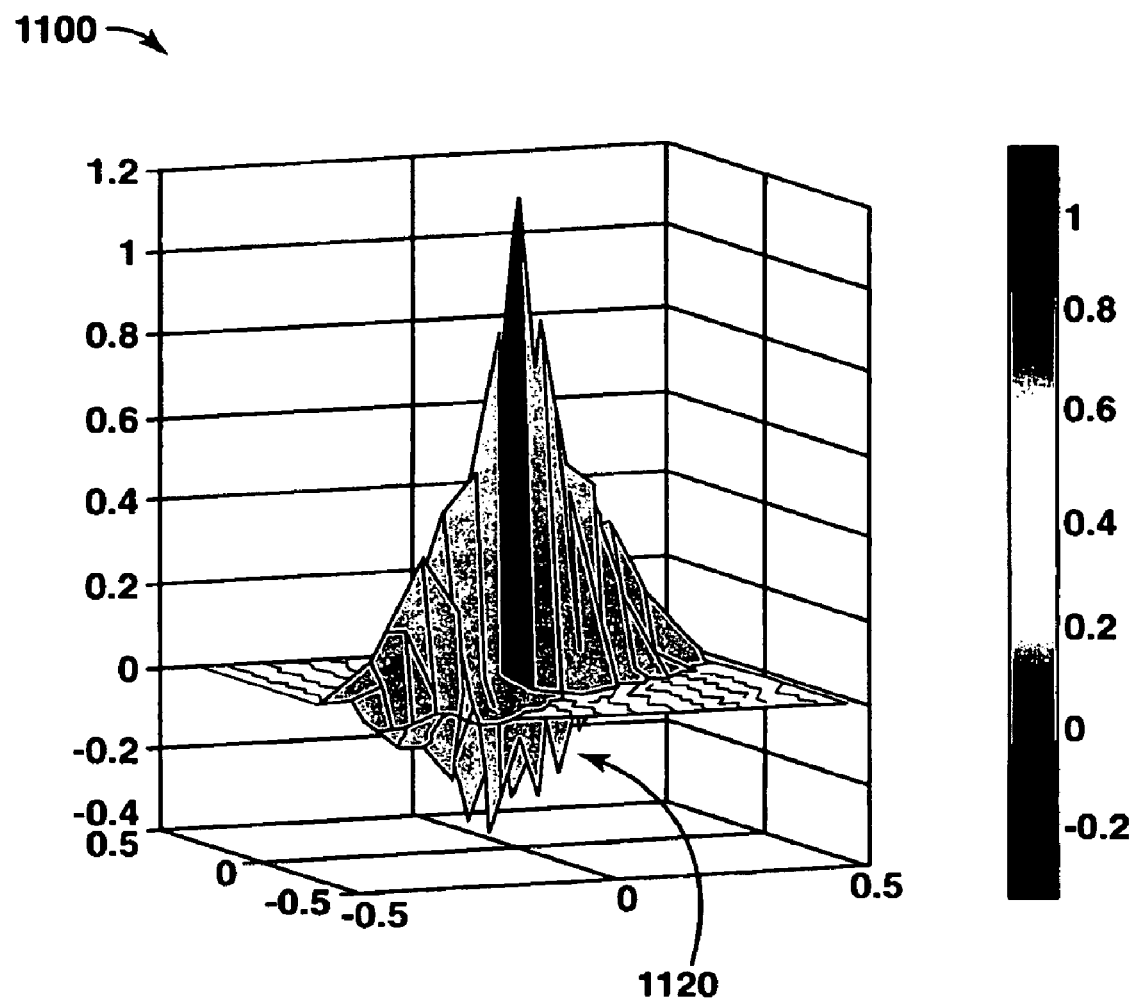
FIG. 11 illustrates a graph of results obtained using conventional MPFA.
Figure 12:
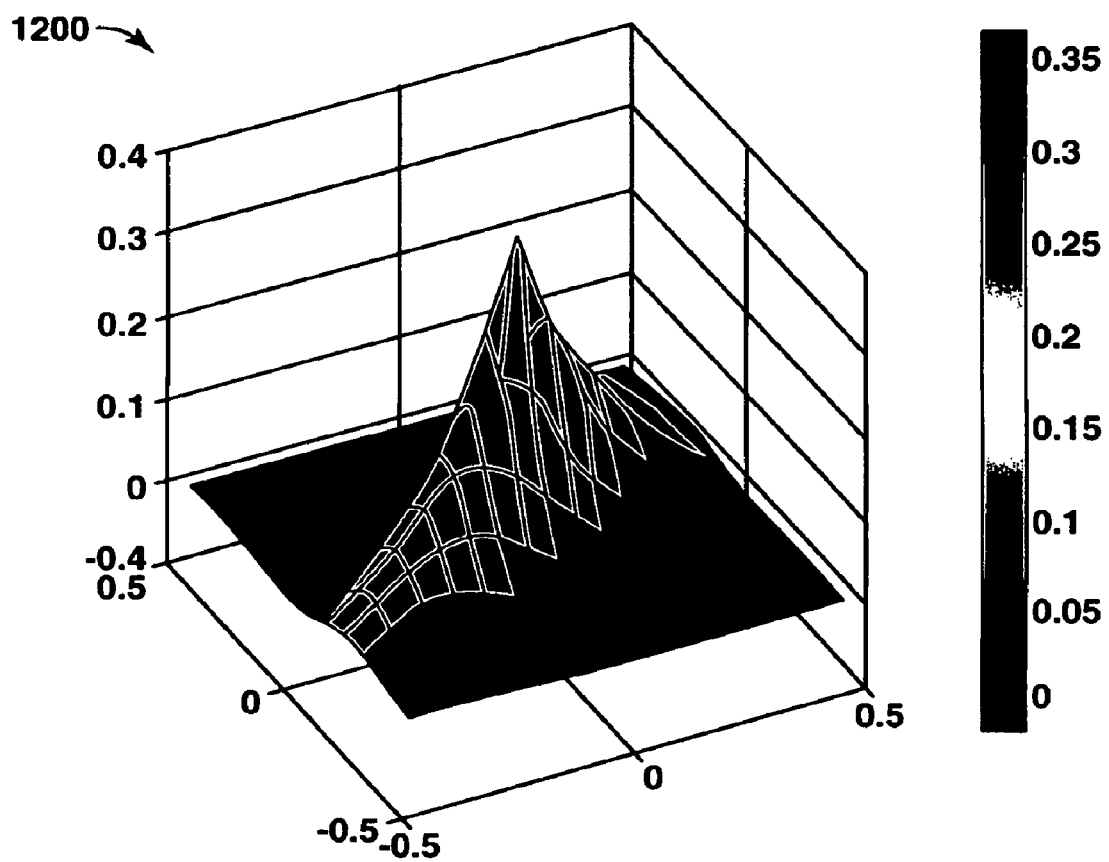
FIG. 12 illustrates a graph of results obtained using EMPFA.

As boundary conditions, a constant pressure value is imposed at the domain boundary and a constant flow rate is specified as the combined flux through the edges of the grid block at (0, 0) to simulate a well there. Numerical results are presented as graphs 1100 and 1200 of FIGS. 11 and 12, corresponding to MPFA and EMPFA, respectively, for quadrilateral control volumes and $k_1=1$, $k_2=1000$, and $\varphi=\pi/3$. Numerical oscillations in solutions obtained using MPFA are clearly indicated by negative values 1120 in the graph 1100. In contrast, in solutions obtained using EMPFA, shown in graph 1200 of FIG. 12, no such oscillations are seen.

In 3D, test grids may be constructed for studying numerical oscillations with the domain first divided into horizontal layers. Subsequently, a two dimensional mesh may be built on the x-y plane, and then projected in z direction to each layers of the domain. Optionally, the grid is randomly perturbed vertically using the following mapping:

$$(x,y,z) \rightarrow (x,y,z+\kappa \Delta z \operatorname{rand}([-1,1])), 0 < \kappa < 0.5 \qquad (30)$$

where $\Delta z$ is the thickness of the layers and constant $\kappa$ is between 0 and 0.5. After the perturbation, the top and bottom faces of each grid block are no longer horizontal, though faces on the side remain vertical. Similar to the 2D case, an anisotropic permeability field may be constructed which takes the form $K=O_x^T \Lambda O_x$, where $\Lambda=\text{diag}(\mu, v, 1)$ and $O_x$ is the rotation matrix around x-axis:

$$O_x = \begin{pmatrix} 1 & 0 & 0 \\ 0 & \cos\varphi & \sin\varphi \\ 0 & -\sin\varphi & \cos\varphi \end{pmatrix} \quad (31)$$

Figure 13:
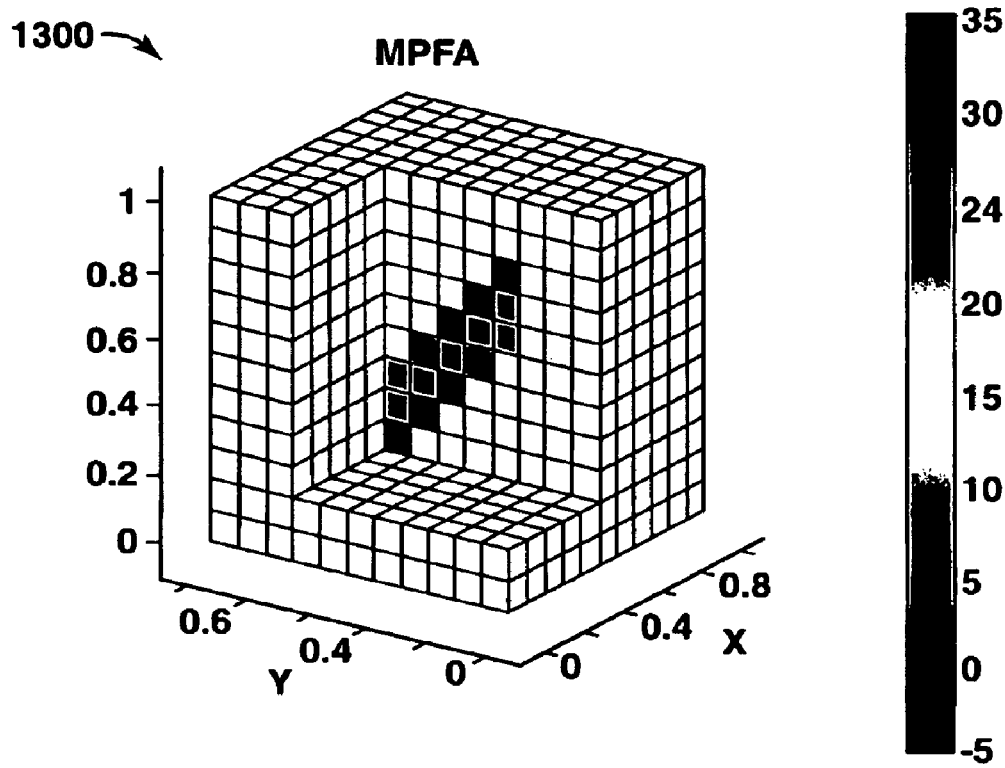
FIG. 13 illustrates a three-dimensional diagram illustrating solutions from MPFA compared to EMPFA.
Figure 13:
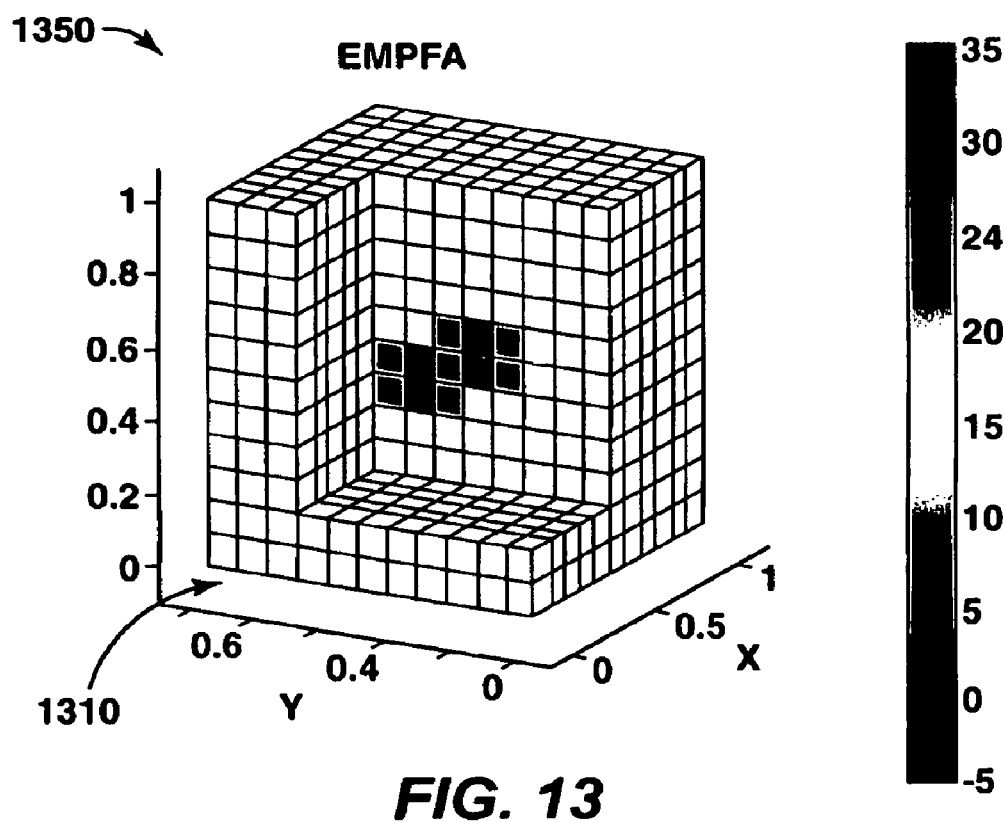

For the test, $\kappa$ for the vertical perturbation may be set to 0.3, and parameters $\mu$, $v$, and $\varphi$ in the definition of K are equal to 1000, 1000, and $\pi/6$, respectively. Results for MPFA and EMPFA are shown as graphs 1300 and 1350 shown in FIG. 13. Again, graph 1300 clearly shows non-physical oscillations 1310 that occur in the solutions obtained via MPFA, while such oscillations are eliminated when EMPFA is employed.

Improvement in Solution Accuracy

The 2D pressure equation with permeability given by Eq. (29) admits an analytical solution of form $p(x,y)=-s\log(r)+t$, where s and t are constants and $$r = \sqrt{\xi^2 + \eta^2},$$

with:

$$\begin{pmatrix} \xi \\ \eta \end{pmatrix} = \begin{pmatrix} k_1^{-0.5} & 0 \\ 0 & k_2^{-0.5} \end{pmatrix} \begin{pmatrix} \cos\theta & -\sin\theta \\ \sin\theta & \cos\theta \end{pmatrix} \begin{pmatrix} x \\ y \end{pmatrix} \quad (32)$$

Figure 14:
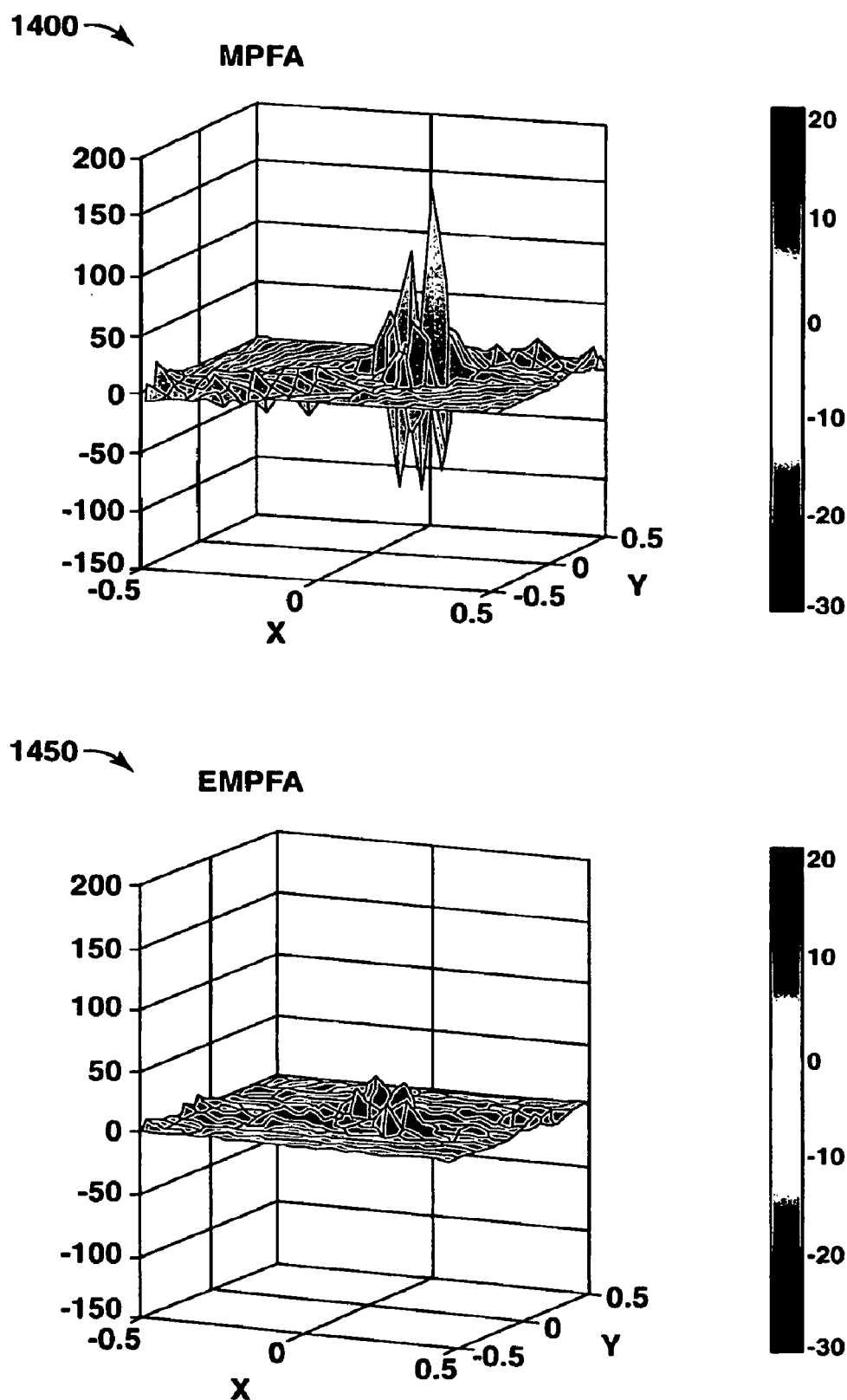
FIG. 14 illustrates a graph of errors in results obtained using conventional MPFA versus EMPFA.

Constants s and t may be chosen so that $p(x,y) \geq 0$ everywhere. A well may be assumed to be located at the middle of the computation domain. Errors in approximations obtained via MPFA and EMPFA are plotted as graphs 1400 and 1450, respectively, shown in FIG. 14. It is evident by comparing graphs 1400 and 1450 that errors in fluxes are much smaller for EMPFA than MPFA.

Convergence of Solutions

Tests have also been performed to verify that solutions obtained using EMPFA converge at a comparable rate to those obtained using MPFA. Considering the 2D case first, to determine the convergence rate of EMPFA, following discrete $L_2$ error may be defined for pressure:

$$\delta_p = \left[ \sum_i |V_i|(\tilde{p}_i - p_i)^2 \right]^{0.5} \quad (33)$$

where the sum is over all blocks in the computation domain, and $\tilde{p}_i$ and $p_i$ are exact solution and numerical solution for pressure, respectively. For fluxes, the $L_2$ error is:

$$\delta_f = \left[ \frac{\sum_k V_{e_k} (\tilde{F}_{e_k} - F_{e_k})^2 |l_{e_k}|^{-2}}{\sum_k V_{e_k}} \right]^{0.5} \quad (34)$$

where the sum is over all edges, $|l_e|$ is the edge length, and $V_e$ is the area sum of all sub-volumes sharing the edge.

The first example used for examining convergence assumes $[-0.5, 0.5] \times [-0.5, 0.5]$ as the computation domain and permeability tensor $K=\text{diag}(10,1)$. In this example, Eq. (2) admits an exact analytical solution $$p(x,y) = \cos(\pi x)\cos(\pi y) + 2 \quad (35)$$

Using values of $p(x, y)$ at the domain boundary as boundary conditions, the problem is solved numerically. In the process, grids of different levels of refinement have been generated by first refining the Cartesian mesh uniformly and then perturbing the fine mesh to obtain a random grid. Convergence results are presented in Table 1 below.

TABLE 1

| | EMPFA | | | | MPFA | | | |
|---|---|---|---|---|---|---|---|---|
| # blocks | $\delta_p$ | $q_p$ | $\delta_f$ | $q_f$ | $\delta_p$ | $q_p$ | $\delta_f$ | $q_f$ |
| 8 | 0.01593 | | 1.4039 | | 0.01892 | | 1.7415 | |
| 16 | 0.00344 | 2.21 | 0.6198 | 1.18 | 0.00369 | 2.36 | 0.7691 | 1.18 |
| 32 | 0.00082 | 2.06 | 0.2702 | 1.20 | 0.00100 | 1.88 | 0.3851 | 1.00 |
| 64 | 0.00023 | 1.81 | 0.1195 | 1.18 | 0.00029 | 1.78 | 0.1835 | 1.07 |

Figure 15A:
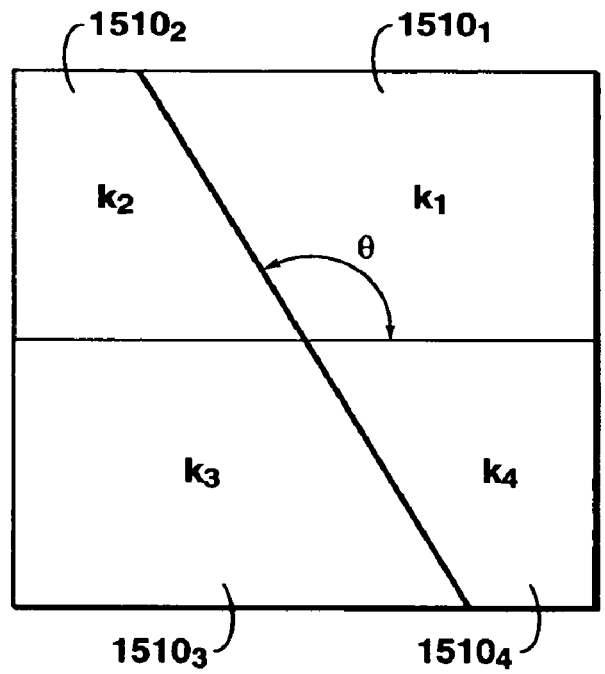
FIGS. 15A and 15B illustrate an exemplary computation region with discontinuous permeability, and a grid of regions with discontinuous regions.

A second example for examining convergence considers a discontinuous permeability field. FIG. 15A shows the computation domain which is divided into four regions, $1510_1$-$1510_4$, each having a different permeability ($k_i$). Within each region, the permeability is assumed constant, isotropic, and diagonal, or $K_i = k_i I$, where the index i goes from 1 to 4.

Figure 15B:
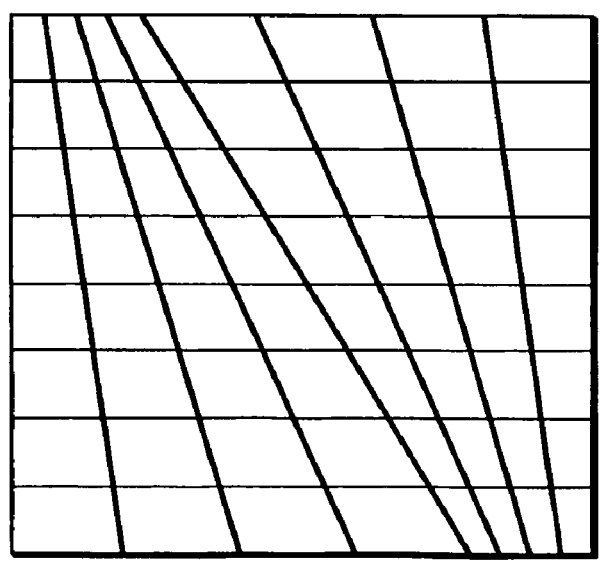

This example allows for exact analytical solutions which take the following form in polar coordinates:

$$p(x,y) = r^\alpha (a_i \sin(\alpha\theta) + b_i \cos(\alpha\theta)) \quad (36)$$

for (x, y) in each region i. The constants, $\alpha$, $a_i$, and $b_i$, are determined from continuity conditions for pressure and flux across region boundaries and are functions of $k_i$ and $\phi$. For $k_1=100$, $k_2=k_3=k_4=1$, and $\phi=2\pi/3$, one possible set of these constants are $\alpha=0.7547$, $a_1=1.00995$, $a_2=a_3=a_4=1.9999$, $b_1=1$, and $b_2=b_3=b_4=100.98019$. Using values of p(x, y) at the domain boundary as the boundary condition, and a grid 1500 which honors permeability discontinuities as shown in FIG. 15B, the single phase pressure equation is again solved numerically. Results in Table 2 indicate that, for EMPFA, the convergence rate is close to $h^{2\alpha}$—the optimal rate for conforming finite element methods. Similar results have been obtained for permeability fields with $k_1=k_3=1$, $k_2=k_4=5$, 10, or 100, and $\phi=\pi/2$.

TABLE 2

| # blocks | EMPFA | | | | MPFA | | | |
|---|---|---|---|---|---|---|---|---|
| | $\delta_p$ | $q_p$ | $\delta_f$ | $q_f$ | $\delta_p$ | $q_p$ | $\delta_f$ | $q_f$ |
| 8 | 0.2688 | | 6.5372 | | 0.3360 | | 4.9486 | |
| 16 | 0.1044 | 1.36 | 4.1590 | 0.65 | 0.1255 | 1.42 | 3.1238 | 0.66 |
| 32 | 0.0393 | 1.41 | 2.5827 | 0.69 | 0.0454 | 1.47 | 1.9380 | 0.69 |
| 64 | 0.0145 | 1.44 | 1.5803 | 0.71 | 0.0162 | 1.49 | 1.1877 | 0.71 |

The 3D case may now be considered. To more accurately determine the convergence rate for 3D problems, the following discrete $H_{div}$ error is defined:

$$\delta_{f,div} = \left[ \sum_i \int_{\partial V_i} (F \cdot n + K\nabla p \cdot n)^2 \, ds \right]^{0.5} \quad (37)$$

Same type of two and half dimensional grid and anisotropic permeability tensor as described above for the elimination of non-physical oscillations are used. In the test, $\kappa$ in Eq. (30) is set to 0.3, and parameters $\mu$, $v$, and $\phi$ in the definition of K are equal to 10, 10, and $\pi/6$, respectively. Numerical convergence results corresponding to grids based on quadrilateral or polygonal areal mesh are shown below in Tables 3 and Table 4, which confirm convergence of EMPFA obtained solutions that are comparable to, or better than, MPFA.

TABLE 3

| # blocks | $\delta_p$ | $q_p$ | $\delta_f$ | $q_f$ | $\delta_{f,div}$ | $q_{f,div}$ |
|---|---|---|---|---|---|---|
| 2 | 0.1351 | | 6.2790 | | 11.025 | |
| 4 | 0.0297 | 2.18 | 3.2825 | 0.94 | 7.7657 | 0.51 |
| 8 | 0.0072 | 2.05 | 1.4317 | 1.20 | 4.5238 | 0.78 |
| 16 | 0.0018 | 2.01 | 0.6645 | 1.11 | 2.8617 | 0.66 |

TABLE 4

| # blocks | $\delta_p$ | $q_p$ | $\delta_f$ | $q_f$ | $\delta_{f,div}$ | $q_{f,div}$ |
|---|---|---|---|---|---|---|
| 18 | 0.0497 | | 6.2519 | | 12.8438 | |
| 100 | 0.0222 | 1.41 | 4.2373 | 0.68 | 10.6348 | 0.33 |
| 648 | 0.0068 | 1.90 | 2.2228 | 1.04 | 7.3477 | 0.59 |
| 4624 | 0.0019 | 1.92 | 1.1290 | 1.03 | 5.0205 | 0.58 |

CONCLUSION

By introducing an additional pressure unknown within an interaction region, enriched multipoint flux approximation (EMPFA) techniques presented herein may be used to reduce or eliminate numerical oscillations in solutions that occur when using conventional MPFA. EMPFA may be used to improve the consistency and accuracy in constructing pressure interpolations in cells for the purpose of determining flux equations used in modeling and predicting flow in a reservoir.

As can be appreciated, the above described methods and processes may be performed by a computer system. The computer system may include a processor and computer-readable storage medium containing executable instructions to perform the various methods. The computer system may include various user interfaces to interact with a user of the system, such as a mouse, monitor, keyboard, or other similar interface devices. Also, the storage medium may include databases, hard drives and other suitable storage devices, for example.

We claim:

1. A computer-implemented method of modeling flow of a fluid within a reservoir comprising:
    dividing a reservoir into a finite number of grid cells that forms a grid of the reservoir;
    defining interaction regions contained within adjacent grid cells in the grid, each interaction region being defined by first and second sets of points, the first set of points representing a grid cell center of each of the adjacent grid cells from which said each interaction region is defined, and the second set of points being edge centers defined as midpoints of lines separating adjacent grid cells defining each interaction region;
    defining subvolumes within each interaction region, each subvolume defined by a grid cell center of a first one of the grid cells, edge centers of lines separating the first one of the grid cells defining each interaction region from others of the grid cells defining said each interaction region, and a vertex representing a point where all grid cells defining said each interaction region meet;
    performing, using the computer, multipoint flux approximation operations that allow continuous pressure interpolation within one of the interaction regions by for each subvolume, performing piecewise approximation to derive a set of equations in terms of pressures at grid cell centers and edge centers, the set of equations containing an unknown pressure parameter at the vertex, and deriving and solving flux balance equations to eliminate the unknown pressure parameter at the vertex;

using pressure values obtained by the multipoint flux approximation operations, modeling the flow of fluid within the reservoir; and outputting the model of fluid flow.

2. The computer-implemented method of claim 1, wherein the piecewise approximation is a piecewise linear approximation.

3. The computer-implemented method of claim 1, wherein the piecewise approximation:

is a piecewise bilinear approximation.

4. The computer-implemented method of claim 1, wherein:

the grid is a three-dimensional grid;

the interaction regions are three-dimensional;

the subvolumes are three-dimensional and are further defined by face centers; and the piecewise approximation is a piecewise trilinear approximation.

5. The computer-implemented method of claim 1, wherein the grid comprises at least one of a Cartesian grid and a Voronoi grid.

6. A computer-implemented method of modeling flow of a fluid within a reservoir comprising:

dividing a reservoir into a finite number of grid cells that forms a grid of the reservoir;

defining an interaction region contained within adjacent grid cells in the grid, each interaction region being defined by first and second sets of points, the first set of points representing a grid cell center of each of the adjacent grid cells from which said each interaction region is defined, and the second set of points being edge centers defined as midpoints of lines separating adjacent grid cells defining each interaction region;

defining subvolumes within each interaction region, each subvolume defined by a grid cell center of a first one of the grid cells, edge centers of lines separating the first one of the grid cells defining each interaction region from others of the grid cells defining said each interaction region, and a vertex representing a point where all grid cells defining said each interaction region meet;

for each subvolume, performing, using the computer, piecewise interpolation to derive a set of equations for pressure interpolation within the interaction region in terms of at least five unknown pressure parameters local to the subvolume, including at least one unknown pressure parameter at the vertex;

deriving and solving, from the set of equations for pressure interpolation, a set of flux equations in terms of global unknown pressure parameters to eliminate the unknown pressure parameters local to the subvolume; and modeling the flow of fluid within the reservoir.

7. The computer-implemented method of claim 6, wherein the at least five unknown pressure parameters local to the subvolume include at least four unknown pressures at edge centers associated with the subvolume.

8. The computer-implemented method of claim 6, wherein performing piecewise interpolation comprises at least one of piecewise linear interpolation, piecewise bilinear interpolation, and piecewise trilinear interpolation.

9. The computer-implemented method of claim 6, wherein the global unknown pressure parameters comprise pressures at grid cell centers.

10. A computer-readable storage medium containing executable instructions which, when executed by a processor, performs operations for enriched multipoint flux approximation comprising:

(a) defining interaction regions contained within adjacent grid cells of a finite number of grid cells that form a grid dividing a reservoir, each interaction region being defined by grid cell centers of each of the grid cells forming the interaction region and edge centers of lines separating adjacent grid cells forming the interaction region;

(b) defining subvolumes within each interaction region, each subvolume defined by a grid cell center of a first one of the grid cells, edge centers of lines separating the first one of the grid cells forming each interaction region from others of the grid cells defining said each interaction region, and a vertex representing a point where all grid cells defining said each interaction region meet;

(c) generating a linear system of equations in terms of global pressure parameters by performing enriched multipoint flux approximation operations for each subvolume that allow continuous pressure interpolation within multiple interaction regions by introducing at least one unknown pressure parameter within each of the multiple interaction regions, the at least one unknown pressure parameter including an unknown pressure parameter at the vertex of each interaction region;

(d) solving the linear system of equations to eliminate the at least one unknown pressure parameter within each of the multiple interaction regions; and (e) outputting a solution of the linear system of equations.

11. The computer-readable storage medium of claim 10, wherein the operations comprise repeating at least operations (c) and (d) for multiple discrete points in time to simulate flow in the reservoir.

12. The computer-readable storage medium of claim 11, wherein at least operations (c) and (d) are repeated multiple times at each of the multiple discrete points in time until a solution of the linear system of equations converges.

13. A computer-implemented method for predicting one or more flow-based material properties of a reservoir, comprising:

dividing a reservoir into a finite number of grid cells that forms a grid of the reservoir;

defining an interaction region contained within adjacent grid cells in the grid, the interaction region being defined by first and second sets of points, the first set of points representing a grid cell center of each of the adjacent grid cells forming the interaction region, and the second set of points being edge centers defined as midpoints of lines separating adjacent grid cells defining the interaction region;

defining subvolumes within the interaction region, each subvolume defined by a grid cell center of a first one of the grid cells, edge centers of lines separating the first one of the grid cells from others of the grid cells, and a vertex representing a point where all grid cells forming the interaction region meet;

deriving, using the computer, a set of equations for interpolation of a parameter within the interaction region for each subvolume in terms of at least five unknown values of the parameter local to the subvolume, including at least one unknown value of the parameter at the vertex;

deriving, from the set of interpolation equations, a system of equations in terms of global unknown values of the parameter to thereby eliminate the at least five unknown values of the parameter local to the subvolume;

solving the system of equations to predict the one or more flow-based material properties; and outputting the solved system of equations.

14. A computer-implemented method for predicting the pressure gradient in a reservoir, comprising:

dividing the reservoir into a finite number of grid cells to form a grid of the reservoir;

defining an interaction region contained within adjacent grid cells in the grid, the interaction region being defined by first and second sets of points, the first set of points representing a grid cell center of each of the adjacent grid cells forming the interaction region, and the second set of points being edge centers defined as midpoints of lines separating adjacent grid cells defining the interaction region;

defining subvolumes within the interaction region, each subvolume defined by a grid cell center of a first one of the grid cells, edge centers of lines separating the first one of the grid cells from others of the grid cells, and a vertex representing a point where all grid cells forming the interaction region meet;

deriving, using the computer, a set of equations for pressure interpolation within the interaction region for each subvolume in terms of at least five unknown pressure parameters local to the said each subvolume, including at least one unknown pressure parameter at the vertex;

deriving, from the set of pressure interpolation equations, a system of equations in terms of global unknown pressure parameters to thereby eliminate the at least five unknown pressure parameters local to said each subvolume;

solving the system of equations to predict the pressure gradient in the reservoir; and outputting the prediction of the pressure gradient in the reservoir.

\* \* \* \* \*